US011475649B2

(12) United States Patent
Konchenko et al.

(10) Patent No.: US 11,475,649 B2
(45) Date of Patent: Oct. 18, 2022

(54) DATA STRUCTURES FOR AUGMENTED REALITY PLANNING OF GEOGRAPHIC LOCATIONS

(71) Applicant: Schlumberger Technology Corporation, Sugar Land, TX (US)

(72) Inventors: Andrey Konchenko, Menlo Park, CA (US); Kim Swift, Gainesville, FL (US); Bruce MacKay, Houston, TX (US); Sergey Doronichev, Menlo Park, CA (US); Siau Ban Teh, Menlo Park, CA (US); Markus Schlafli, Mountain View, CA (US); Salvador Ruiz-Esparza, Von Ormy, TX (US); Jared Krichko, Von Ormy, TX (US); Ewan Maxwell, Buenos Aires (AR); Rod Shampine, Sugar Land, TX (US); Apoorva Dubey, Menlo Park, CA (US); Jared Bruns, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/309,220

(22) PCT Filed: Nov. 6, 2019

(86) PCT No.: PCT/US2019/060059
§ 371 (c)(1),
(2) Date: May 7, 2021

(87) PCT Pub. No.: WO2020/097197
PCT Pub. Date: May 14, 2020

(65) Prior Publication Data
US 2021/0398354 A1 Dec. 23, 2021

Related U.S. Application Data

(60) Provisional application No. 62/757,023, filed on Nov. 7, 2018.

(51) Int. Cl.
*G06T 15/00* (2011.01)
*G06T 19/00* (2011.01)
(Continued)

(52) U.S. Cl.
CPC .......... *G06T 19/006* (2013.01); *G06F 21/602* (2013.01); *G06F 30/12* (2020.01);
(Continued)

(58) Field of Classification Search
CPC ............ G06T 7/62; G06T 7/70; G06T 19/006
See application file for complete search history.

(56) References Cited

U.S. PATENT DOCUMENTS 5,687,305 A * 11/1997 Graham ................. G06T 3/005
345/662
9,092,899 B1 7/2015 Lininger
(Continued)

OTHER PUBLICATIONS

International Preliminary Report on Patentability of International Patent Application No. PCT/US2019/060059 dated May 20, 2021, 10 pages.
(Continued)

*Primary Examiner* — Charles Tseng
(74) *Attorney, Agent, or Firm* — Michael Guthrie

(57) ABSTRACT

A method including obtaining a first image of a geographical location and a physical object located therein. Pixels in the first image are assigned to corresponding points in a Cartesian coordinate system defined specifically for the first image. The resulting virtual map includes a virtual representation of the physical object, a set of Cartesian coordinates assigned to a set of pixels in the pixels, and a set of Cartesian rotation angles assigned to the set of pixels. A first transform is calculated that scales the Cartesian coordinate system to a physical scale of the geographical location. A data structure stored in a data repository is formed by applying the first transform to the virtual map. The data
(Continued)

structure includes the set of pixels, a set of scaled Cartesian coordinates, the set of Cartesian rotation angles, and a physical scale virtual representation of the physical object.

20 Claims, 11 Drawing Sheets

(51) Int. Cl.
| | |
|---|---|
| *G06T 7/62* | (2017.01) |
| *G06T 7/70* | (2017.01) |
| *G06F 30/12* | (2020.01) |
| *G06F 21/60* | (2013.01) |
| *G06K 9/62* | (2022.01) |
| *G06T 19/20* | (2011.01) |
| *H04N 5/232* | (2006.01) |

(52) U.S. Cl.
CPC .............. *G06K 9/6201* (2013.01); *G06T 7/62* (2017.01); *G06T 7/70* (2017.01); *G06T 19/20* (2013.01); *H04N 5/23296* (2013.01); *G06T 2200/24* (2013.01); *G06T 2219/2016* (2013.01)

(56) References Cited

U.S. PATENT DOCUMENTS

| | | |
|---|---|---|
| 9,329,286 B2 | 5/2016 | Jones et al. |
| 10,010,379 B1 | 7/2018 | Gibby et al. |
| 2011/0050562 A1 | 3/2011 | Schoen et al. |
| 2012/0105473 A1* | 5/2012 | Bar-Zeev .................. G06T 1/20 |
| | | 345/633 |
| 2012/0254781 A1 | 10/2012 | Larsen et al. |
| 2014/0320485 A1 | 10/2014 | Neophytou et al. |
| 2015/0242440 A1 | 8/2015 | Zombo |
| 2016/0238725 A1 | 8/2016 | Jones et al. |
| 2017/0092003 A1 | 3/2017 | Hong et al. |
| 2017/0352192 A1 | 12/2017 | Petrovskaya et al. |
| 2018/0247456 A1 | 8/2018 | Tuo et al. |
| 2019/0102942 A1* | 4/2019 | Farrell ................ G06F 3/04845 |

OTHER PUBLICATIONS

International Search Report and Written Opinion dated Apr. 8, 2020 in PCT/US2019/060059.
Extended European Search Report issued in European Patent Appl. No. 19881348.7 dated Jul. 15, 2022; 10 pages.

* cited by examiner

| | Data Structure 600 | | | | | |
|---|---|---|---|---|---|---|
| Pixel ID | Scaled X | Scaled Y | Scaled Z | $X_r$ | $Y_r$ | $Z_r$ |
| Pixel A | Scaled $X_A$ | Scaled $Y_A$ | Scaled $Z_A$ | $X_{rA}$ | $Y_{rA}$ | $Z_{rA}$ |
| Pixel B | Scaled $X_B$ | Scaled $Y_B$ | Scaled $Z_B$ | $X_{rB}$ | $Y_{rB}$ | $Z_{rB}$ |
| Pixel C | Scaled $X_C$ | Scaled $Y_C$ | Scaled $Z_C$ | $X_{rC}$ | $Y_{rC}$ | $Z_{rC}$ |
| Pixel D | Scaled $X_D$ | Scaled $Y_D$ | Scaled $Z_D$ | $X_{rD}$ | $Y_{rD}$ | $Z_{rD}$ |

DATA STRUCTURES FOR AUGMENTED REALITY PLANNING OF GEOGRAPHIC LOCATIONS

CROSS REFERENCE TO RELATED APPLICATIONS

This application is a utility patent application claiming priority to U.S. Provisional Patent Application 62/757,023, filed Nov. 7, 2018, the entirety of which is hereby incorporated by reference.

BACKGROUND

Planning of an oilfield location is a time-consuming process that involves collaboration between various parties involved in the operations during different stages. The oilfield location may be planned in size, dimensions, and elevation to handle spatial dimensions of various equipment associated with a well's lifecycle and the cycles of services performed at the wellsite.

SUMMARY

In general, in one aspect, the disclosed embodiments relate to a method.

The method includes obtaining a first image of a geographical location and a physical object located within the geographical location. The method also includes assigning a plurality of pixels in the first image to corresponding points in a Cartesian coordinate system defined specifically for the first image to form a processed first image. The method also includes assigning, to generate a virtual map comprising a virtual representation of the physical object, a set of Cartesian coordinates to a set of pixels in the plurality of pixels, and a set of Cartesian rotation angles to the set of pixels. The method also includes calculating a first transform that scales the Cartesian coordinate system to a physical scale of the geographical location. The method also includes applying, to form a data structure stored in a data repository, the first transform to the virtual map. The data structure includes the set of pixels, a set of scaled Cartesian coordinates assigned to the set of pixels, and the set of Cartesian rotation angles assigned to the set of pixels. The data structure further includes a physical scale virtual representation of the physical object.

Other aspects of the technology will be apparent from the following description and the appended claims. Thus, the embodiments described above do not necessarily limit other embodiments described herein.

DETAILED DESCRIPTION

Figure 1:
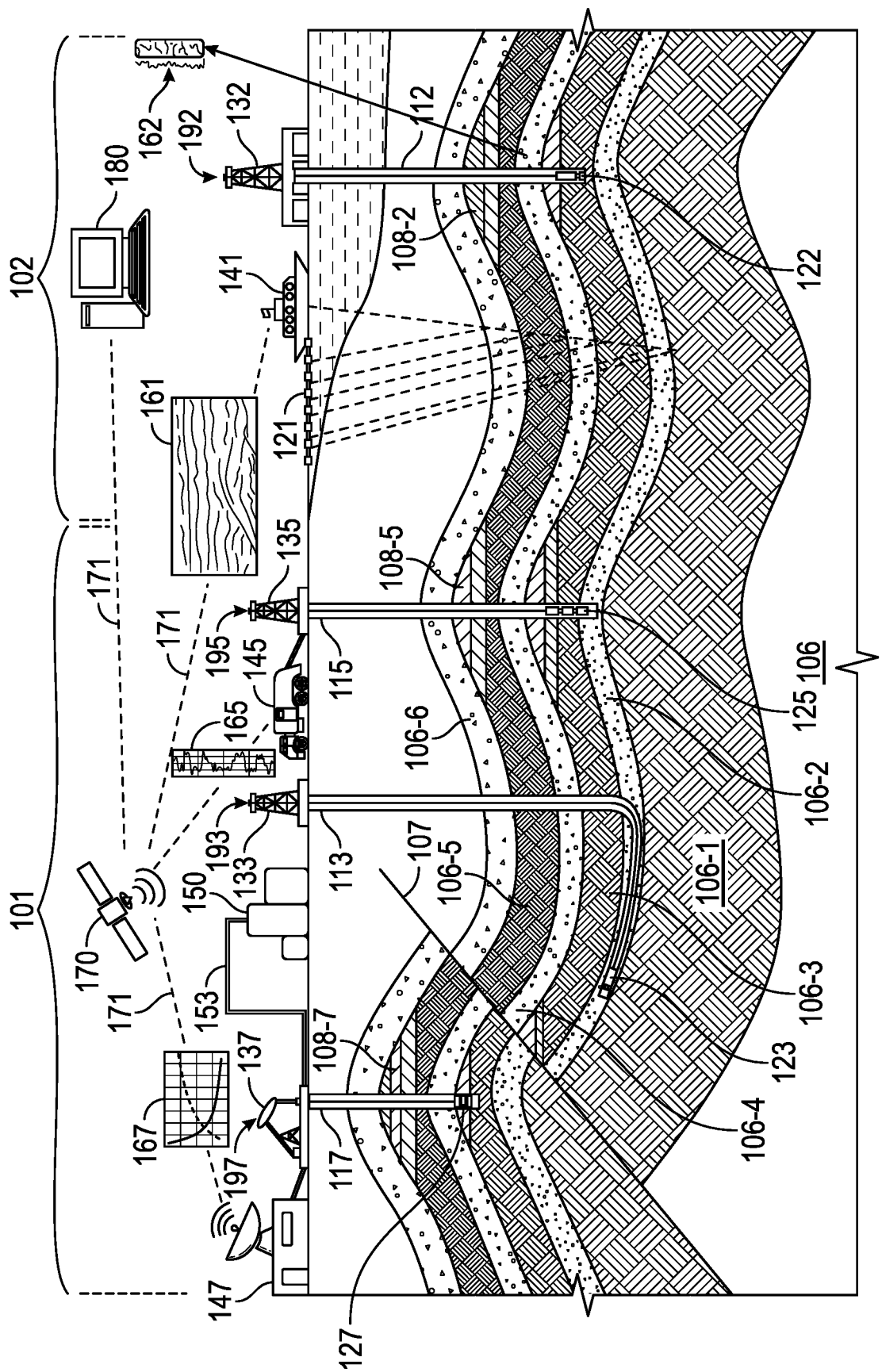
FIG. 1 shows an oilfield, in accordance with an embodiment.

Specific embodiments will now be described in detail with reference to the accompanying figures. Like elements in the various figures are denoted by like reference numerals for consistency.

In the following detailed description of embodiments, numerous specific details are set forth in order to provide a more thorough understanding of the embodiments. However, it will be apparent to one of ordinary skill in the art that the embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to be a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

An embodiment is directed to a data structure which enables creation of a secure augmented reality environment for wellsite planning on a remote computer having limited computing resources. As used herein, "limited computing resources" mean that the local computing device does not have sufficiently powerful physical hardware to enable the type of augmented reality procedure described herein. Using the data structure enables physical scale representation of virtual objects in the augmented reality environment, thereby enabling accurate augmented reality-based planning of the placement of physical equipment to be added or moved at a wellsite. Furthermore, the data structure provides for secure virtual representations of physical objects across multiple different users of the same wellsite or different wellsites, thereby improving cyber security in a collaborative augmented reality environment. Thus, computers may perform the tasks described herein, thereby improving the computers. Accordingly, the data structure and methods of using the data structure described herein offer technical improvements over other virtual planning and augmented reality techniques.

FIG. 1 shows an oilfield, in accordance with an embodiment. In particular, FIG. 1 depicts a schematic view, partially in cross section, of an onshore field (101) and an offshore field (102) in which an embodiment may be implemented. In an embodiment, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), and production pipelines (153). The fields (101), (102) also include an exploration and production (E&P) computer system (180) connected to the data acquisition tools (121), (123), (125), (127) through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5). Many other geological layers may also be present. A fault plane (107) may extend through the formations. In particular, the geologic sedimentary basin includes rock formations and may include at least one reservoir including fluids, for example the sandstone layer (106-5). In an embodiment, the rock formations include at least one seal rock, for example, the shale layer (106-6), which may act as a top seal. In an embodiment, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In an embodiment, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In an embodiment, a wellsite system may be connected to a production equipment. For example, the well system (197) is connected to the surface storage tank (150) through the fluids transport pipeline (153).

In an embodiment, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In an embodiment, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In an embodiment, the surface units (141), (145), and (147) are communicatively coupled to the E&P computer system (180) via the communication links (171). In an embodiment, the communication between the surface units and the E&P computer system may be managed through a communication relay (170). For example, a satellite, tower antenna or any other type of communication relay may be used to gather data from multiple surface units and transfer the data to a remote E&P computer system for further analysis. One of the types of data that may be gathered is an overhead image of the wellsite.

Generally, the E&P computer system (180) may be a cloud based system, such as those described below with respect to certain embodiments of FIG. 2A and FIG. 3. The E&P computer system (180) may be used to create the data structures described herein, starting from an overhead image of the wellsite, as described below with respect to FIG. 2A through FIG. 13.

The E&P computer system (180) may also be configured to analyze, model, control, optimize, or perform management tasks of the aforementioned field operations based on the data provided from the surface unit. In an embodiment, the E&P computer system (180) is provided with functionality for manipulating and analyzing the data, such as analyzing seismic data to determine locations of hydrocarbons in the geologic sedimentary basin (106) or performing simulation, planning, and optimization of exploration and production operations of the wellsite system. In an embodiment, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined. The E&P computer system and/or surface unit may correspond to a computing system, such as the computing system shown in FIGS. 14 and 15 and described below.

Figure 2A:
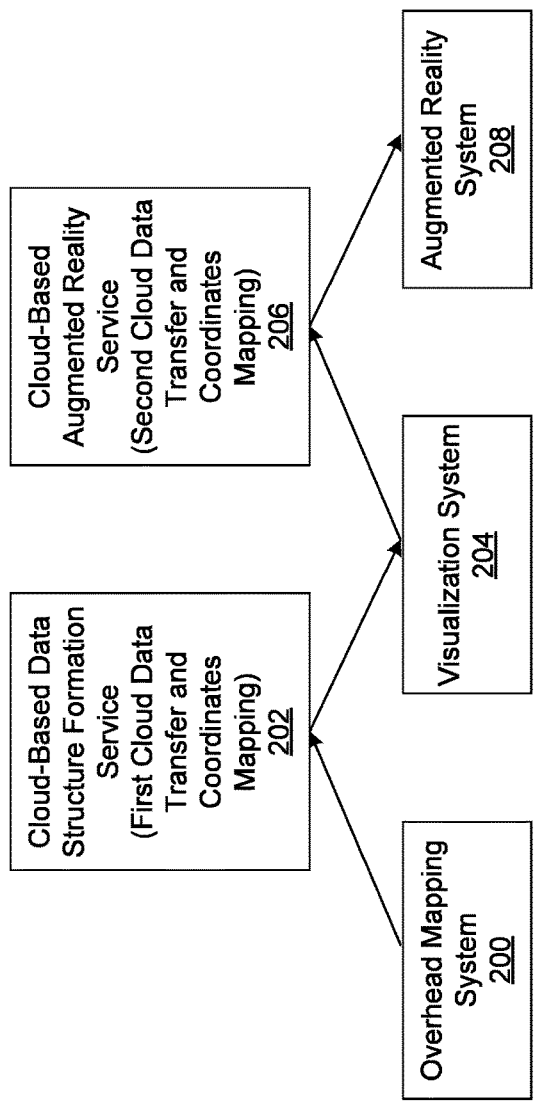
FIG. 2A is a block diagram of a process and a system for creating a data structure, in accordance with an embodiment.

FIG. 2A is a block diagram of a process and systems for creating a data structure, in accordance with an embodiment. The process and systems shown in FIG. 2A may be used to enhance security and improve performance of an augmented reality system or E&P computer system, such as that shown in FIG. 1, through the use of the data structure. FIG. 2A may be considered, in an embodiment, to be an overview of the system shown in FIG. 3 and the flowchart shown in FIG. 4.

Initially, an overhead mapping system (200) receives an overhead image of a wellsite. The overhead mapping system may be a drone, an aircraft, a satellite, or other device including a camera capable of taking an overhead image of the physical area where the wellsite is located. The overhead mapping system may, in an embodiment, also include a computer system for processing the image. The computer system may be the E&P computer system (180) described with respect to FIG. 1 or the computing system shown in FIGS. 14 and 15. The image taken may be processed to be a geotagged image. A geotagged image may be a photograph which is associated with a geographical location by geotagging. Geotagging may be performed by assigning at least a latitude and longitude to the image, and optionally an altitude, and a compass bearing. Possibly other fields may also be included for a geotagged image.

The image taken by the overhead mapping system (200) is transmitted to a cloud-based data structure formation service (202). The transfer may be considered a first cloud data transfer. The cloud-based data structure formation service (202) is software and hardware, remote from the overhead mapping system, which is programmed to perform coordinate mapping of the image. In particular, a coordinate system is imposed on the image. In an embodiment, each pixel in the image is provided with X, Y, and Z coordinates in a Cartesian coordinate system defined specifically for the image, together with a rotation angel for each of the X, Y, and Z coordinates. In an embodiment, the Cartesian X, Y, and Z coordinates may be applied first, and the rotation coordinates are added later, as described further below.

In an embodiment, virtual pixels can be put to the virtual environment. A virtual pixel is a pixel that does not exist on the original first image, but which has been added to a virtual representation of the image (i.e., the virtual map). These virtual pixels, or a virtual group of pixels forming virtual object, can be used for operations planning purposes, training, marketing, or any business processes as described elsewhere herein.

The rotation angle is defined with respect to a selected direction on the image and a corresponding coordinate of the pixel along the selected direction. The selected direction may be defined with respect to a corresponding axis. Thus, for example, the rotation angle for an X coordinate of a pixel may be designated $X_R$, which refers to an angle formed between the X axis and an imaginary line between the center of the Cartesian coordinate system to the X coordinate of the pixel. Similar rotation angles may be calculated for the Y and Z coordinates of the pixel. Each pixel in the image may be treated similarly.

Alternatively, the pixels may be arranged in groups of pixels. In this case, each group of pixel is assigned Cartesian coordinates and rotation angles.

Figure 2B:
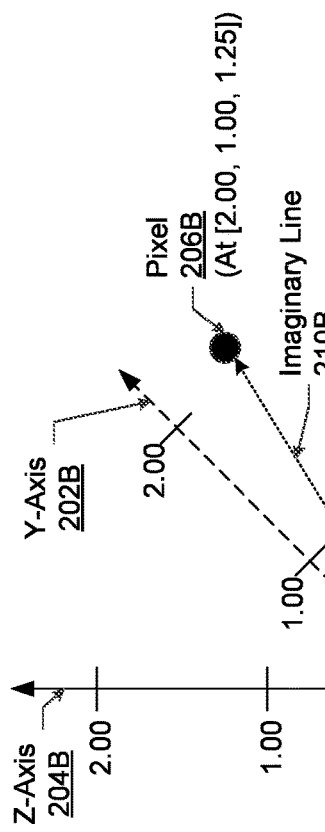
FIG. 2B is an example of a three dimensional Cartesian coordinate system, in accordance with an embodiment.
Figure 2B:
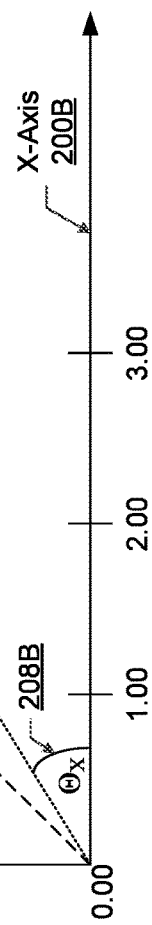

Turning to FIG. 2B, an example of a three-dimensional Cartesian coordinate system is shown, in accordance with an embodiment. In particular, FIG. 2B illustrates a rotation angle, $\Theta_X$ (208B). $\Theta_X$ (208B) corresponds to $X_R$, defined above. FIG. 2B also illustrates how the location of a pixel would be defined in the three-dimensional coordinate system.

A Cartesian coordinate system is defined by one or more axes. For two dimensional or higher dimensional coordinate systems, the axes are perpendicular to each other. Thus, for example, a three dimensional Cartesian coordinate system may be defined by three perpendicular, or orthogonal, axes. In FIG. 2B, X-Axis (200B) defines a "length," Y-Axis (202B) defines a "width," and Z-Axis (204B) defines a "height." Note, however, that the terms "length," "width," and "height" are relative to each other, and such terms could be appended to any combination of the axes shown. Nevertheless, the three-dimensional Cartesian coordinates use three orthogonal, that is perpendicular, axes: X-Axis (200B), Y-Axis (202B), and Z-Axis (204B).

Any point in the three dimensional space defined by the Cartesian coordinate system may be defined by three numbers. Each number represents a distance along the respective axis relative to a center point, "0.00", which is common to the axes. For example, Pixel (206B) may be defined in FIG. 2B as being at 2.00 along the X-Axis (200B), 1.0 along the Y-Axis (202B), and 1.25 along the Z-Axis (204B). To be succinct, the position of the Pixel (206B) in FIG. 2B may be recorded in the following one-dimensional matrix: [2.00, 1.00, 1.25].

For an image, the center point, 0.00, may be defined anywhere within the image, though in some cases the center points may be defined at a corner of the image or possibly in a center of the image.

The rotation angle may now be visualized. Again, the rotation angle is defined with respect to a selected direction on the image and a corresponding coordinate of the pixel along the selected direction. The selected direction may be defined with respect to a corresponding axis. Thus, for example, the rotation angle for an X coordinate of the Pixel (206B) may be designated $X_R$, which refers to the angle, $\Theta_X$, (208B) formed between the X-Axis (200B) and an imaginary line (210B) between the center of the Cartesian coordinate system to the X coordinate of the Pixel (206B). In other words, angle "$\Theta_X$" (208B) is the rotation angle $X_R$ for Pixel (206B). Note that there will be three rotation angles for Pixel (206B), one for each of the three orthogonal axes. However, for clarity, the rotation angles for Pixel (206B) with respect to the Y-Axis (202B) and the Z-Axis (204B) are not shown in FIG. 2B.

Thus, the Pixel (206B) may be defined in the Cartesian coordinate system of FIG. 2B as a 1x6 matrix in the form of $[X, Y, Z, X_R, Y_R, Z_R]$. In the example of FIG. 2B, Pixel (206B) would be defined in the Cartesian Coordinate system as [2.00, 1.00, 1.25, $\Theta_X$, $\Theta_Y$, $\Theta_Z$]. In an embodiment, each pixel in an image may be so-defined.

Another value in the one dimensional matrix may define an identity of the pixel. Another value in the one dimensional matrix may define a color of the pixel. Other values in the one dimensional matrix may represent other metadata of interest to be recorded, such as wellsite information, structural information of objects in the image, pixel group identifier, etc.) Accordingly, each image may be represented by a mathematic matrix of size N×M, where "N" represents the number of pixels and "M" represents the one dimensional size of a matrix used to describe any one pixel.

The one or more embodiments are not limited to the use of a Cartesian coordinate system, as described with respect to FIG. 2B. In still another alternative, a coordinate system other than a Cartesian coordinate system may be applied to the pixels in the image. For example, when the wellsite is large enough that the curvature of the Earth is to be taken into account, the pixels may be assigned coordinates in a spherical coordinate system. In this case, each pixel or group of pixels is assigned two angles and a scalar distance which uniquely identifies the location of the pixel in the spherical coordinate system with respect to a central point in the spherical coordinate system.

Whichever coordinate system is used, in an embodiment, the zero point of the coordinate system may be a center of the image. However, other zero points may be selected, such as a corner of the image, though potentially any point in an image may be designated the zero point in a coordinate system. The result of addition of the coordinate system is a virtual map of the wellsite.

Returning to FIG. 2A, after imposing the initial coordinate system, the cloud-based data structure formation service (202) uses a transform to scale the coordinates to a physical scale of the wellsite. As used herein, a "physical scale" refers to a scale reflecting the true dimensions of a physical object, within a measure of uncertainty. Note that "physical scale" does not mean "life size." For example, a "life size" representation of a ten meter truck on a display would requiring at least a ten meter display device. However, a "physical scale" representation may be subject to a reduction by scalar value. Thus, for example, a display on a mobile phone could display a ten meter truck (in physical actuality) after applying a 1/100 scalar so that the image of the truck on mobile phone display is 1 centimeter. However, the "true" size of the truck is still being tracked because the scalar can be reversed to know the actual size of the physical truck. In the "physical" scale, objects being represented have the same scalar applied. In this manner, the same relative size difference between a two meter tall human and a hundred meter tall building may be displayed. Although, on the display device (at a 1/100 scalar), the human would be displayed as being 0.2 centimeters tall and the building would be displayed as 10 centimeters tall. Because the relative size between the physical human and the physical building is accurately displayed, it can be said that the human and the building are displayed at a "physical scale."

Thus, the transform changes the designated coordinates of the virtual map so that the coordinates and units assigned to objects in the image correspond to real measurements of objects shown in the image. The transform may be accomplished by comparing the image and objects in the image to reference positions. The reference positions may be for example, global positioning coordinates, and latitude and longitude coordinates. The reference positions may also be established by reference to objects in the image of known dimensions. Other transform creation methods may be used. Transform creation methods are described further below.

Figures 5, 6:
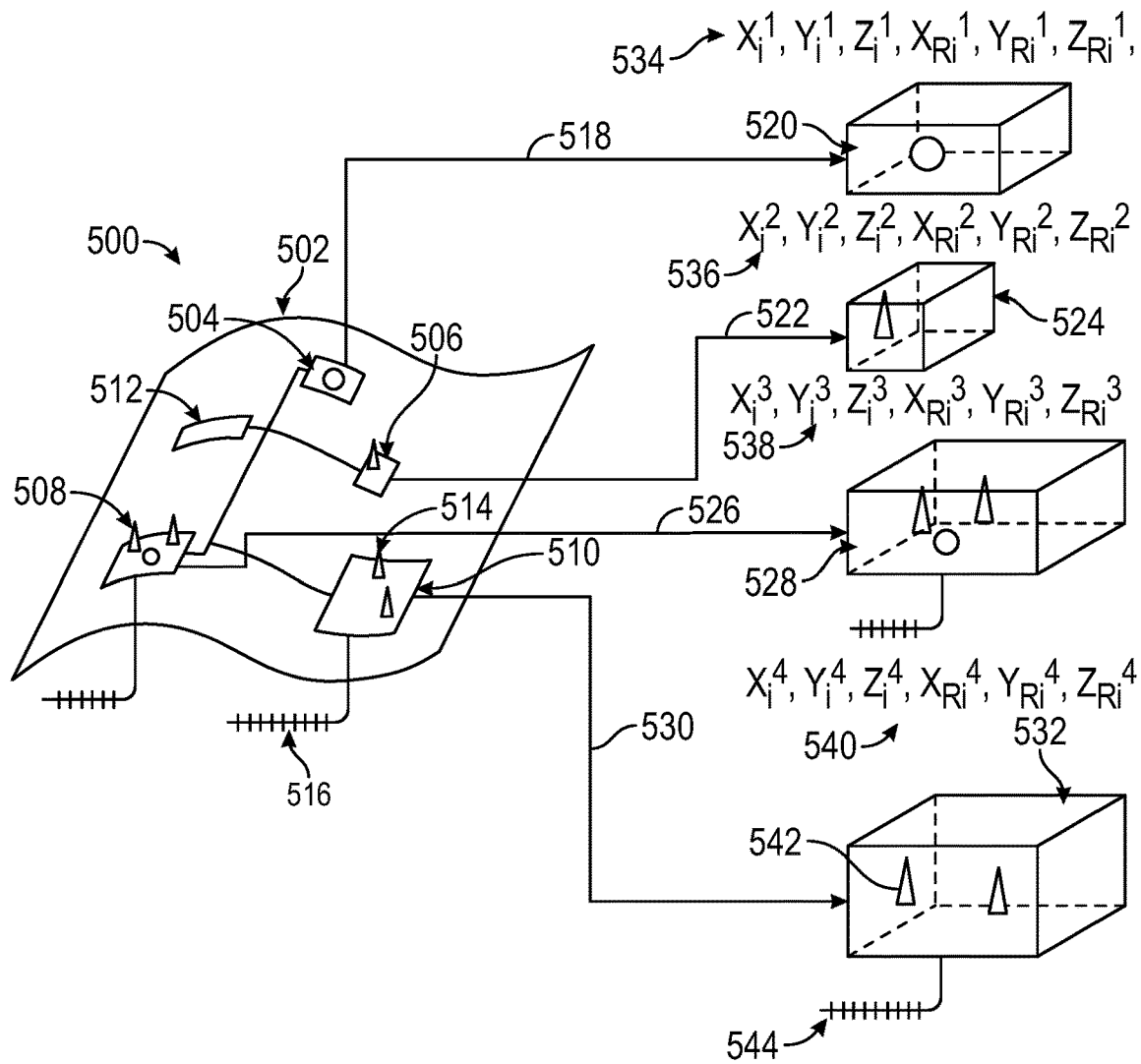
FIG. 5 is a visual representation of the method shown in FIG. 4, in accordance with an embodiment.
FIG. 6 is an example of a data structure useful for rendering a virtual representation of a physical object shown in an image, in accordance with an embodiment.

When completed, a data structure is formed specifically for the image in question. The data structure includes, for each pixel or set of pixels, scaled coordinates in the coordinate system plus rotation angles for each of the scaled coordinates. An example of such a data structure is shown in FIG. 6. For security purposes, the data structure may be encrypted, as described further below.

The data structure may be transmitted to a visualization system (204). The visualization system is software and/or hardware configured to render an image using the data structure generated by the cloud-based data structure formation service (202). The visualization system may be a remote computer, such as a mobile device or tablet in the field at the wellsite, or perhaps a desktop computer at an office responsible for managing the wellsite.

The visualization system may display, to a user, a virtual representation of the wellsite and virtual representations of objects that were imaged as being at the wellsite. Virtual objects (objects not in the original image) may be added to the virtual environment and displayed by the visualization system. The user, possibly with other wellsite management software tools, may then perform wellsite planning, as described with respect to FIG. 1, using the virtual representation.

Note that because each data structure is specially defined for any given image, and because each data structure may be encrypted or may be subject to controlled access, different users of the visualization system (204) may know that information access to the wellsite or wellsites is controlled. Thus, a first company working with a data structure defined for a first wellsite knows that the data structure for the first wellsite is secured from and different than another data structure defined for a second, adjacent wellsite owned by a second company. Additionally, if two different companies have agreed to share access to a single wellsite, encryption and/or process controls in the visualization system (204) may be used to ensure that access is granted to information that is desired to be shared. Thus, the cloud-based data structure formation service (202) may be used by many different companies in a secure cyber environment.

The data structure created by the cloud-based data structure formation service (202) has other applications. In particular, the data structure may be used in an augmented reality system. Augmented reality joins a user's current view in reality with one or more virtual objects. As such, the coordinate matrix is transformed to the real coordinate system matrix for pixels on the actual location or for the group of pixels (object) on the location.

For example, the data structure may be passed to a cloud-based augmented reality service (206). Passing of the data structure may be from the visualization system (204) to the cloud-based augmented reality service (206), in some embodiments, or directly from the cloud-based data structure formation service (202) in other embodiments. The cloud-based augmented reality service (206) is software and/or hardware configured to create an augmented reality display on an augmented reality system (208). In turn, the augmented reality system (208) may be a remote computer with a camera, located at the wellsite.

In an embodiment, a user with a remote computer (e.g., mobile phone, tablet, desktop computer, etc.) takes an image or video of a wellsite with a camera connected to the remote computer. In many cases, the image or video is taken from the ground level, not overhead, though the image or video could be taken from many different angles, including overhead.

The image or video taken by the camera of the remote device is then transmitted to a local system, such as the cloud-based augmented reality service (206). A comparison between the data structure and the concurrently taken image or video is performed. A second transform is used to correlate pixels in the data structure to pixels in the concurrently taken image of the remote device. Thus, the second transform transforms the virtual coordinates into actual coordinates. Additionally, a virtual object may be created, possibly by the visualization system (204). The virtual object may be imposed over the concurrently taken image or video. The imposed image is then transmitted to the remote computer, which overlays the imposed image over the concurrent image taken by the remote computer. A user may then manipulate the virtual object imposed on the concurrently taken image of the wellsite. Examples of this process are shown in FIG. 9 through FIG. 13.

The cloud-based data structure formation service (202) and the cloud-based augmented reality service (206) may each be implemented as container-based services. A "container" or "software container" is computer code which enables software to operate on multiple different platforms. Thus, the one or more embodiments described above, and described further below, may be implemented using multiple different types of computes and operating systems.

Figure 3:
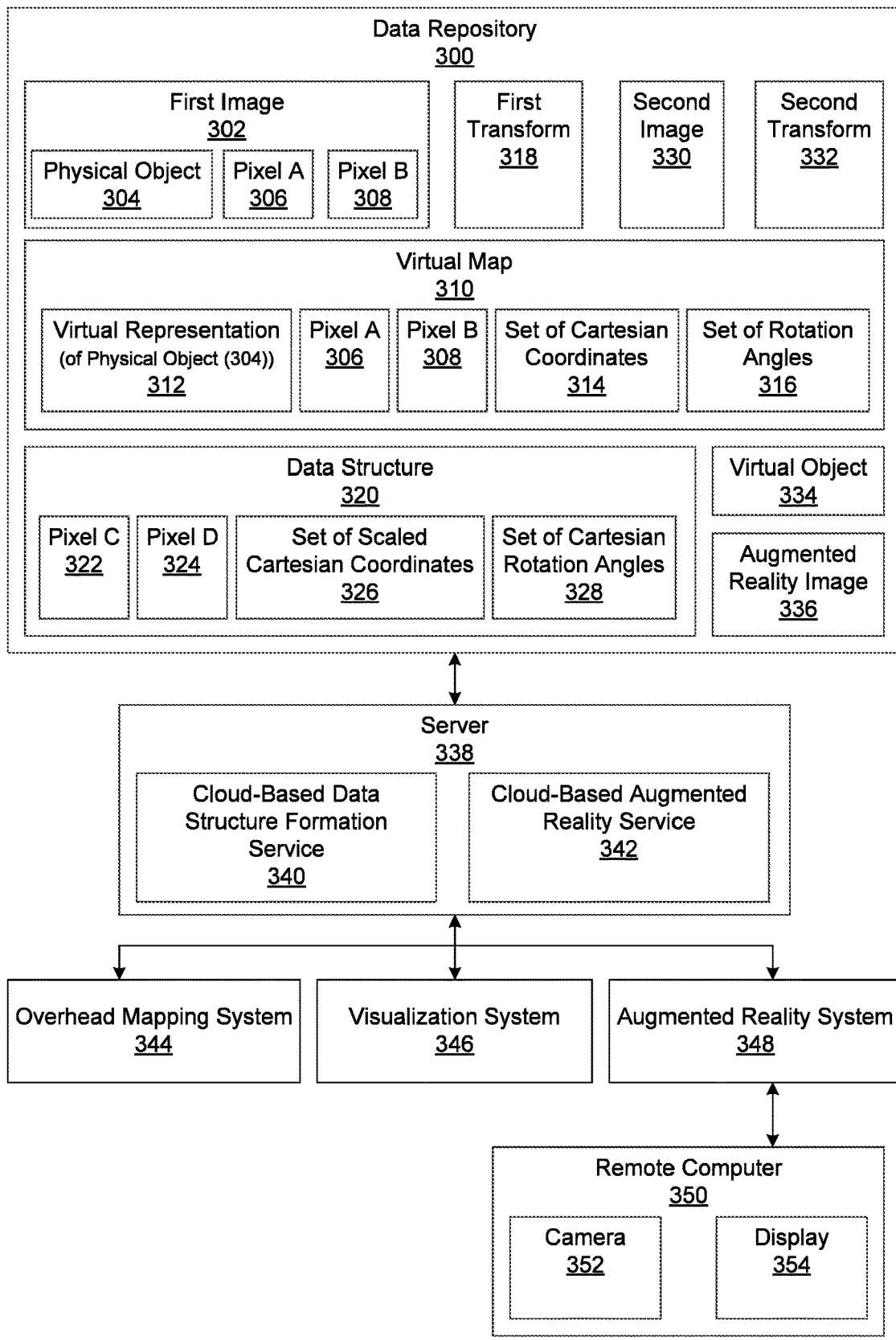
FIG. 3 is a block diagram of a system for creating a data structure, in accordance with an embodiment.

FIG. 3 is a block diagram of another system for creating a data structure which enhances security and improves performance of an augmented reality system, in accordance with an embodiment. The system shown in FIG. 3 is a more detailed version of the system shown in FIG. 2A.

The system includes a data repository (300). In one or more embodiments, the data repository (300) stores a number of files and other information. In general, a data repository (300) is a storage unit (e.g., database, file system, or other storage structure) and/or hardware or virtual device (e.g., non-transitory computer readable storage medium, memory, storage server, etc.) for storing data. The data repository (300) may include multiple homogeneous or heterogeneous storage units or devices.

The data repository (300) may store various data used in the process described with respect to FIG. 3. For example, the data repository (300) may include a first image (302). The first image (302) may be the overhead image described with respect to FIG. 2A. The first image (302) may be of a geographical location, such as but not limited to a wellsite, and may include terrain, equipment, buildings, and other objects.

The first image (302) may include a set of pixels that define a physical object (304) shown in the first image (302). A pixel is a physical point at a defined location in the image with a corresponding value. The use of the term pixel corresponds to the standard definition used in the art. The image, the set of pixels, or both may include many pixels, such as but not limited to Pixel A (306) and Pixel B (308). Thus, in an embodiment, Pixel A (306) and Pixel B (308) are both pixels that form part of the physical object (304) in the first image (302). In another embodiment, Pixel A (306) and Pixel B (308) are both pixels that form other parts of the first image (302).

The data repository (300) may also store a virtual map (310). The virtual map (310) is a virtual representation of the first image (302). Thus, the virtual map (310) also includes a virtual representation (312) of the physical object (304). In an embodiment, the virtual map (310) may be limited to the virtual representation (312) of the physical object (304). In another embodiment, the virtual map (310) may include multiple virtual representations of multiple objects, or may include a virtual representation of the entire first image (302).

The virtual map (310) is defined, in part, by the pixels, because the virtual representation (312) of the physical object (304) is defined by Pixel A (306) and Pixel B (308). However, the virtual map (310) is also defined by a Cartesian coordinate system which places the pixels in the context of the Cartesian coordinate system. Note that in some embodiments, the Cartesian coordinate system may be replaced by a spherical coordinate system, a cylindrical coordinate system, or some other coordinate system.

A coordinate system may be assigned to each image and/or virtual map. Thus, in the case of the Cartesian coordinate system, the virtual map (310) is further defined by a set of Cartesian coordinates (314) and a corresponding set of rotation angles (316). Each pixel may be assigned a corresponding set of Cartesian coordinates (314). For example, in the case of a three-dimensional image, the Pixel A (306) may be assigned an $X_A$ coordinate, a $Y_A$ coordinate, and a $Z_A$ coordinate. The first letter indicates the axis of the Cartesian coordinate value and the second letter indicates the pixel to which the Cartesian coordinate belongs. Thus, for example, "$X_A$" indicates the value Pixel A has along the X-axis of the Cartesian coordinate system. Together, $X_A$, $Y_A$, and $Z_A$ form a set of Cartesian coordinates (314) that defines the position of Pixel A (306) in the Cartesian coordinate system.

Each value of the set of Cartesian coordinates (314) is given a corresponding rotation angle. Thus, in a three-dimensional Cartesian coordinate system, the set of rotation angles (316) includes three rotation angles, one for each value of the set of Cartesian coordinates (314). In a specific example, then, Pixel A (306) is assigned three rotation angles: $X_R$, $Y_R$, and $Z_R$. The first letter indicates the Cartesian coordinate value referenced and the second letter indicates a rotation angle. Thus, for example, "$X_R$", in this case, refers to the rotation angle assigned to the value of the X axis assigned to Pixel A (306).

The rotation angles are defined with respect to a reference direction selected for the first image (302). The reference direction may be an axis. For example, assume Pixel A (306) is located at coordinates $X_A$, $Y_A$, and $Z_A$. A virtual line may be drawn from the center of the Cartesian coordinate system to Pixel A (306) (see FIG. 2B for an example of a virtual line and a rotation angle). A first angle between the X-axis and the virtual line is "$X_R$". Similarly, a second angle between the Y-axis and the virtual line is "$Y_R$". Similarly again, a third angle between the Z-axis and the virtual line is "$Z_R$." The set of rotation angles (316) can be used later in the visualization of the resulting data structure. The set of rotation angles (316) may also be used to correlate the data structure to a second image taken by a remote device during augmented reality imaging, as described with respect to FIG. 4.

In an alternative embodiment, the reference direction used for determining a rotation angle need not be an axis. For example, the reference direction may be defined arbitrarily within a given image. In a specific example, the reference direction may be "North," with respect to the image and true North on the Earth, with the rotation angles determined for the X coordinate and the Y coordinate of the pixel in question with respect to "North."

The data repository (300) also includes a first transform (318). The first transform (318) is a mathematical operation or set of mathematical operations which scale the coordinates of the pixels in the coordinate system to correspond to the physical measurements of the corresponding real objects shown in the first image (302). The first transform (318) may be performed by comparing the first image (302) to a known reference which can be used to identify the actual size of objects shown in the first image (302).

The reference may be a measurement of one or more objects in the first image (302) of known dimension. For example, if the first image (302) shows a truck that is known to be 503 centimeters long, 301 centimeters tall, and 221 centimeters wide, then these dimensions can be used to assign both a scale and units of measurement to the coordinate system assigned to the first image (302). Thus, the coordinates assigned to any given pixel may be scaled to match the dimensions of the known object.

The reference may be measured by comparison to a global positioning system measurement or measurements of objects or the terrain shown in the first image (302). Thus, for example, the global positioning system measurements may allow for the scaling and unit assignment described above.

The reference may be measured by comparison to known latitude and/or longitude coordinates of objects or terrain shown in the first image (302). Thus, for example, the latitude and longitude positions may allow for the scaling and unit assignment described above.

Other reference methods are contemplated. Regardless of the reference method used, a mathematical operation or operations may be used to convert pixels in the first image (302) to the desired scale, thereby forming the first transform (318).

The data repository (300) also includes a data structure (320). A specific example of the data structure (320) is shown in FIG. 6. The data structure includes a set of pixels, including Pixel C (322) and Pixel D (324), which are taken from the first image (302). Note that one or both of the Pixel C (322) and the pixel D (324) may be the Pixel A (306) and the Pixel B (308) in an embodiment.

In the data structure (320), each pixel of the set of pixels is assigned a set of scaled Cartesian coordinates (326). A scaled coordinate, regardless of coordinate system used, is a coordinate which has been multiplied by a scalar (i.e. a "unitless") value. For example, Pixel C (322) may be assigned an X position coordinate, a Y position coordinate, and a Z position coordinate in the Cartesian coordinate system. The X position coordinate may be multiplied by a number so that the physical scale of the corresponding real object in the image is maintained. The product of the X position coordinate and the scalar is the scaled Cartesian X coordinate.

Each such value is recorded in the data structure (320). Likewise, Pixel D (324), and the other pixels in the first image (302), may be assigned a different set of X-Y-Z position coordinates and recorded in the data structure (320).

Note that the set of scaled Cartesian coordinates (326) may be replaced with scaled coordinates in other coordinate systems. Thus, the term "set of scaled Cartesian coordinates (326)" may also be read, in some embodiments, as a "set of spherical coordinates," a "set of cylindrical coordinates," etc. In each case, at least one value of the coordinate system is scaled to match the real physical dimensions of at least one object shown in the first image (302).

The data structure (320) also includes a set of Cartesian rotation angles. A Cartesian rotation angle is an angle which defines the angle made between a reference angle (such as an axis of the Cartesian coordinate system) and an imaginary line drawn from the center of the Cartesian coordinate system to a given pixel. Thus, a "Cartesian rotation angle" may be a "rotation angle," as described above. Each one of the scaled Cartesian coordinates for a pixel has a corresponding rotation angle, as described above.

Note that in some case, it is possible that the first image (302) does not maintain the same scale along the axes of the Cartesian coordinate system. In other words, an image may be distorted because it is stretched or compressed along one or more directions. In this case, the set of Cartesian rotation angles (328) may be a replaced by a set of scaled Cartesian rotation angles. Scaling of rotation angles may be accomplished by adding to the first transform (318) or by using some other transform.

Note also that the set of Cartesian rotation angles (328) may be replaced with rotation angles in other coordinate systems. Thus, the term "set of Cartesian rotation angles (328)" may also be read, in some embodiments, as a "set of spherical rotation angles," a "set of cylindrical rotation angles," etc. If scaling is desired, as described above, at least one value of the rotation angle is scaled to match the real physical dimensions of at least one object shown in the first image (302).

The data structure (320) has several uses. As described with respect to FIG. 4, the data structure (320) enables a computer or computers to perform improved virtual reality planning and to perform improved augmented reality techniques. Additionally, the data structure (320) may be translated into any other coordinate system for other uses. For example, the data structure (320) may be translated into another geospatial global information system (GIS) or subsurface coordinate system to coordinate execution of a wellsite plan built in a 3D environment.

The data repository (300) may also include a second image (330). The second image (330) may be a photograph, video, or other image taken by a remote device. The second image (330) thus may be used as part of an augmented reality system.

The data repository (300) also includes a second transform (332). The second transform (332) is a mathematical operator or operators, possibly different than the mathematical operator or operators used to define the first transform (318). Specifically, the second transform (332) is operable to transform positions in the virtual map (310) to corresponding positions in the second image (330). In this manner, the second transform (332) allows a comparison between the first image (302) and the second image (330), as described with respect to FIG. 4.

The data repository (300) also includes a virtual object (334). The virtual object (334) is a data structure the includes attributes of a planned physical object and a type of physical object. The virtual object (334) is any type of data structure which can be used to render an object on a display, where the object exists in the virtual environment. For example, the virtual object might be a foundation not actually laid at a wellsite location, or perhaps might be a silo or other equipment not yet present at the wellsite location. Virtual objects are useful as part of the computerized planning for the equipment and procedures that will be defined for the wellsite location.

The data repository (300) also includes an augmented reality image (336). The augmented reality image (336) is an image taken by a camera of a remote computer, combined with the addition of the virtual object (334), and then displayed on a display device connected to the remote computer. The augmented reality image (336) may include other virtual objects. The augmented reality image (336)

may also include other added elements, such as measurements of objects (real or virtual) shown on the display, instructions regarding the use of equipment (real or virtual), procedures to undertake regarding real or virtual aspects of the image, instructions from supervisors or other personnel at the wellsite, etc.

The data repository (300) may be in communication with a server (338). The server (338) is considered a "local" computer because the server (338) is under the control of a provider that controls the data repository (300) and enables a cloud-based data structure formation service (340) and a cloud-based augmented reality service (342). The server (338) may be the exploration and production (E&P) computer system (180) shown in FIG. 1 or may be either the computing system (1400) of FIG. 14, or any of Node X (1422) through Node Y (1424) shown in FIG. 15.

The cloud-based data structure formation service (340) is hardware and/or software which is programmed to generate the virtual map (310) and the data structure (320), as described above, and possibly also the virtual object (334). The data structure formation service is described as "cloud-based" because the hardware and/or software is on one or more computers located remotely from the remote computer (350), described below, (i.e. the service is "in the cloud" or "accessible via the Internet"). Generation of the virtual map (310) and the data structure (320) is described in further detail with respect to FIG. 4.

The cloud-based augmented reality service (342) is hardware and/or software which is programmed to generate the augmented reality image (336) based on a comparison of the first image (302) and the second image (330), with possibly the addition of the virtual object (334). The augmented reality service is described as "cloud-based" because the hardware and/or software is on one or more computers located remotely from the remote computer (350), described below, (i.e. the service is "in the cloud" or "accessible via the Internet"). Generation of the augmented reality image (336) is described further with respect to FIG. 4.

The system shown in FIG. 3 may also, optionally, include an overhead mapping system (344). The overhead mapping system (344) may correspond to the overhead mapping system (200) shown in FIG. 2A. As indicated, the overhead mapping system (344) may be a drone, an aircraft, a balloon, a satellite, or other suitable platform for supporting a camera which can take the first image (302) as an overhead image. In an embodiment, the first image (302) may be simply received by the server (338), and thus the overhead mapping system (344) might not be part of the system.

The system shown in FIG. 3 may also, optionally, include a visualization system (346). The visualization system (346) may correspond to the visualization system (204) shown in FIG. 2A. The visualization system (346) is software and/or hardware which allows the first image (302) to be rendered in a virtual environment. The visualization system (346) may be specifically programmed to render the data structure (320). Because of the possibility that the visualization system (346) is under the control of a third party, while still practicing some of the embodiments (such as adding the virtual object (334) under the control of the owner of the data repository (300)), the visualization system (346) is not necessarily required to be part of the system shown in FIG. 3.

The system shown in FIG. 3 may also, optionally, include an augmented reality system (348). The augmented reality system (348) may correspond to the augmented reality system (208) shown in FIG. 2A. The augmented reality system (348) is software and/or hardware which allows a remote computer (350) to display the augmented reality image (336). The augmented reality system (348) may be logically separated from the cloud-based augmented reality service (342), because the cloud-based augmented reality service (342) is designed to produce the instructions and data structures which can then be rendered by the augmented reality system (348). In some embodiments, the functions of the augmented reality system (348) may be already included in the cloud-based augmented reality service (342); thus, the augmented reality system (348) is not necessarily part of the system shown in FIG. 3.

The system shown in FIG. 3 may also, optionally, include the remote computer (350). The remote computer (350) is considered 'remote' because the remote computer (350) is located at the wellsite, which may be remote from the server (338) which performs off-site data processing. However, it is possible that the remote computer (350) and the server (338) are at the same geographical location; thus, the term "remote" is used for purposes of distinguishing the server (338) that performs the processing from the computer that displays the augmented reality image (336).

The remote computer (350) includes a camera (352). The camera (352) takes still images or video of the wellsite in question.

The remote computer (350) also includes or is in communication with a display (354). The display (354) displays the image or video captured by the camera (352). The cloud-based augmented reality service (342) and/or the augmented reality system (348) transmits instructions to the remote computer (350) so that the display (354) displays the virtual object (334) concurrently over the image or video taken by the camera (352). The combination of the concurrently displayed virtual object (334) and the image or video taken by the camera (352) is termed "augmented reality," and may in some embodiments be the augmented reality image (336) stored on the data repository (300). In other words, it is possible that the augmented reality image (336) is stored on the data repository (300) and transmitted to the remote computer (350). It is also possible that the virtual object (334) is transmitted to the remote computer (350) and the remote computer (350), then added by the remote computer (350) to the image or video shown on the display (354).

Thus, stated differently, the display (354) is configured to display the augmented reality image (336) overlaid on a concurrent image of the geographical location received by the camera (352) to create an augmented view. Note that the augmented reality image and the concurrent image may be displayed at a same scale. In other words, the virtual object (334) is displayed at the same scale as real objects being displayed in the concurrent image being taken by the camera (352).

In a specific example, the virtual object (334) may be a virtual truck. The virtual truck may be highlighted so as to make the truck clearly visible to a user as a virtual object. The virtual truck may be displayed as parked next to a real truck of the same make and model being concurrently being imaged by the camera (352) in real time. Because the virtual object (334) and the concurrent image are displayed at the same scale, the virtual truck will appear in the augmented reality view to be the same size as the real truck concurrently imaged by the camera (352).

In an embodiment, at least some of the processing required in order to use augmented reality is performed by the server (338) and not by the remote computer (350). The remote computer (350) may have limited computing resources; i.e., lacks the hardware to create and display the augmented reality image shown on the display (354) in a timely manner. The server (338), however, may have the computing resources desirable for generating the data required for the remote computer (350) to display the augmented reality image. Thus, the arrangement of components shown for the system of FIG. 3 may be used to overcome a technical challenge of achieving the desired technical effect (the augmented reality image) using a technical effect (i. e., at least the data structure (320). Note that the data structure (320) also overcomes other technical challenges. For example, the data structure (320) enables the transfer of data used for creating a virtual environment for wellsite planning, and for augmented reality use at a wellsite. Computers cannot perform these functions without the data structures described herein.

Figure 4:
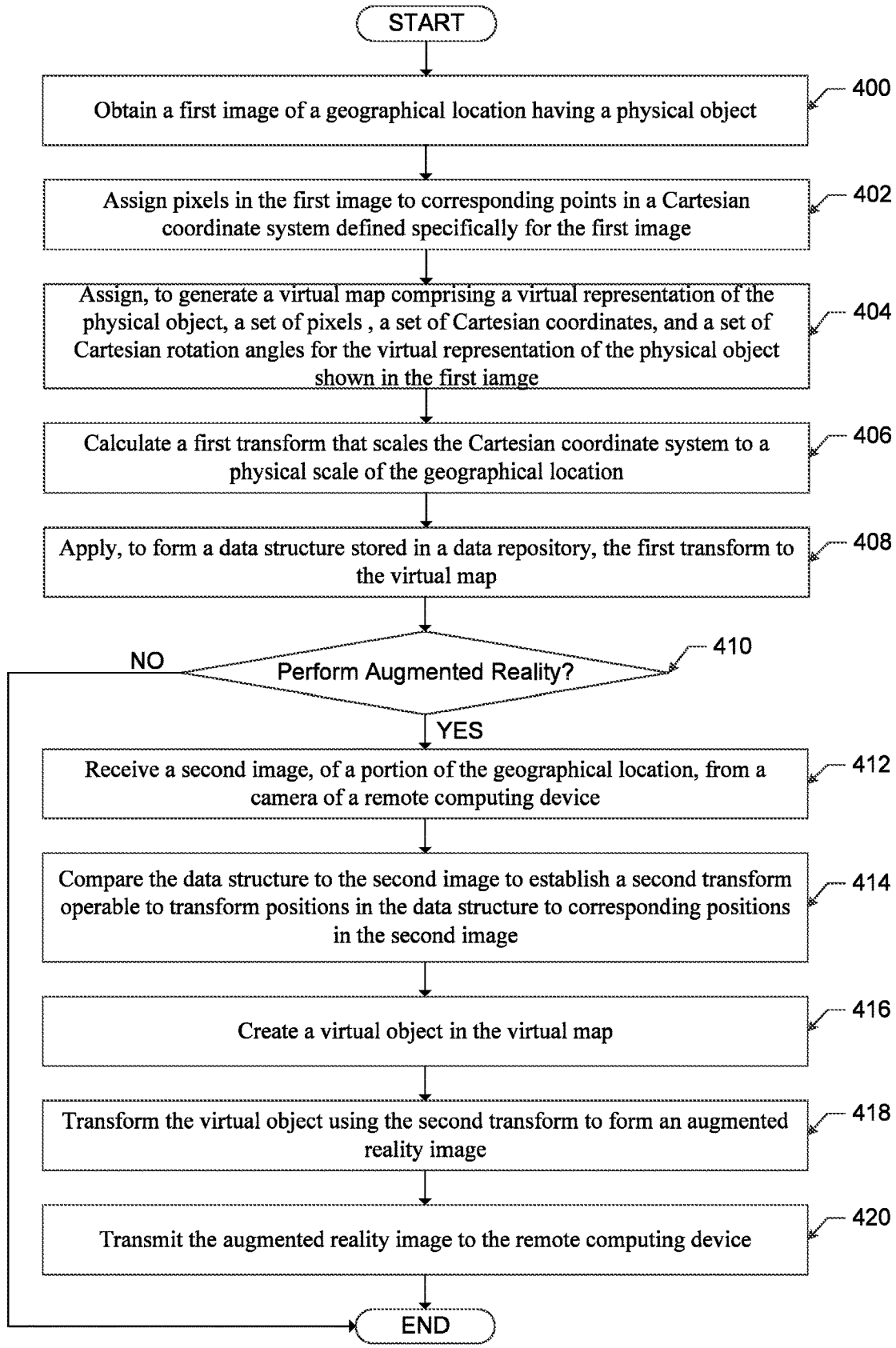
FIG. 4 is a flowchart of a method for creating a data structure, in accordance with an embodiment.

FIG. 4 is a flowchart of a method for creating a data structure which enhances security and improves performance of an augmented reality system, in accordance with an embodiment. The method shown in FIG. 4 may be performed using the system shown in FIG. 2A or the system shown in FIG. 3. The method shown in FIG. 4 may be executed by a processor, such as computer processor(s) (1402) shown in FIG. 14 and/or any of the Node X (1422) through the Node Y (1424) shown in FIG. 15. The method shown in FIG. 4 is an example embodiment and does not necessarily limit other embodiments described herein. While any operation or set of operations mentioned with respect to FIG. 4 may be described in the passive voice, it is assumed that one of these devices, in tandem with hardware and/or software as appropriate, is performing the operation. Additionally, while the method shown in FIG. 4 refers to a Cartesian coordinate system, it is contemplated that other coordinate systems could be used with respect to the method shown in FIG. 4.

At 400, a first image is obtained of a geographical location and a physical object located within the geographical location. The first image may be an overhead image taken by a camera onboard a drone, aircraft, balloon, satellite, etc. The first image may also be retrieved or received from a data repository, possibly from a remotely situated computer, over a network. The first image need not be an overhead image.

At 402, pixels in the first image are assigned to corresponding points in a Cartesian coordinate system defined specifically for the first image. Each pixel may be assigned a point. Alternatively, groups of pixels maybe assigned points in the Cartesian coordinate system. Note also that the coordinate system is defined for the first image and is not a generic coordinate system imposed across images. In other words, in the case of multiple images being processed for multiple wellsites, each image is processed using its own coordinate system. However, in another embodiment, it may be possible to impose a single coordinate system across multiple images.

At 404, a set of pixels, a set of Cartesian coordinates, and a set of Cartesian rotation angles are assigned to a virtual representation of the physical object shown in the first image, thereby generating a virtual map. Stated differently, a virtual object is defined by specifying a set of pixels that compose the object, a set of Cartesian coordinates for each of the set of pixels, and a set of Cartesian rotation angles for each of the set of pixels. While in this example the virtual map may be just the virtual representation of the physical object, the virtual map may also include other virtual representations of other objects in the first image, as indicated above.

The process of assigning at 404 may be performed by pattern recognition software, by photogrammetry, by a user defining an object or area on a display via a user input device, by optical character recognition, or by some other automatic process of recognizing shapes or objects within an image. In other words, pattern recognition may be used to identify objects in an image, and then the pixels that form that object are defined as the "set" of pixels. The process of assigning at 404 may be performed, possibly, prior to receipt of the first image at 400; thus, 404 may be optional in some embodiments.

At 406, a first transform is calculated that scales the Cartesian coordinate system to a physical scale of the geographical location. The transform may be performed by comparing the first image to a reference image, to an external coordinate system, to measurements of known physical objects, etc. In this manner, a Coordinate value for one pixel will be scaled to another coordinate value for another pixel in a manner that reflects about the approximately true relative size of the physical terrain or object represented in the image. Metadata may be used to track the units of the scale (meters, inches, etc.) Metadata may also indicate a scalar used to accomplish a physical scale. In a specific, non-limiting embodiment, transforming may include calculating a correspondence between each X-Y-Z point in the Cartesian coordinates and a latitude, longitude, and elevation of each pixel in the first image.

At 408, the first transform is applied to the virtual map to form a data structure, which may be stored in a data repository. Applying the first transform may be accomplished using a processor, and possibly with a data structure formation service. The data structure is then useable to accurately display the physical scale of objects, or as part of an augmented reality process.

Because the data structure is an improvement to a computer system with many different applications, the method could terminate at this point. Thus, at 410, a determination may be made whether to use the data structure for an augmented reality application. If not, then the method terminates. If so, then the remaining operations of FIG. 4 may be performed.

Assuming the data structure is to be used for augmented reality, then at 412, a second image is received. The second image specifically may be received at a cloud-based augmented reality service. The second image is at least a portion of the geographical location in the first image. The second image is taken concurrently by a camera of a remote computing device. In an embodiment, it may be expected that the first image is an overhead image, and the concurrently taken second image is taken at ground level from the point of view of a person on the ground.

At 414, the data structure is compared to the second image to establish a second transform. The second transform is operable to transform positions in the data structure to corresponding positions in the second image. The second transform may map object and/or pixel locations in the second image to the first image. Then, in combination with the rotation angles and a calculation of the angle difference between the first image and the second image, the second transform may be calculated to correlate the position of any map object and/or pixel location in the second image to a corresponding map object or pixel location in the first image. The first transform, in conjunction with the location of pixels and/or objects within the second image, can then also be used to calculate the physical scale of objects concurrently shown in the second image.

At 416, a virtual object is created in the virtual map. The virtual object may be created by the visualization system. Alternatively, the virtual object could be created at the remote device.

At 418, the virtual object is transformed using the second transform. The result of the transformation is to form an augmented reality image. In other words, the second transform is applied to the virtual object so that the virtual object is at the physical scale of the concurrently taken image, and also is properly rotated to match the orientation of the concurrently taken image. Accordingly, the augmented reality image and the concurrent image are displayed at a same scale.

At 420, augmented reality image is transmitted to the remote computing device. The transmission may be accomplished by transmitting the data which the remote computing device can use to render the transformed virtual object as an overlay on top of the concurrently taken image. The transmission may also include other data the remote computing device can use to render other changes to the concurrently taken image, or changes to the virtual object. Thus, for example, the user could manipulate the virtual object while viewing the overlay and the concurrently taken image. The method of FIG. 6 may terminate thereafter.

The one or more embodiments contemplate variations to the method of FIG. 4. For example, the scale of virtual reality objects can change with a changing zoom setting of the camera of the remote computing device. Thus, the zoom setting of the camera may be changed, resulting in a corresponding adjustment to the displayed size of the augmented reality image to maintain the same scale.

Other data may also be displayed as part of the augmented reality image. For example, the one or more embodiments contemplate concurrently displaying concurrently displaying measurements of one of a) the augmented reality image, b) the physical object, and c) the virtual object. The measurements may be overlaid on or near the corresponding image or object in order to indicate tow which object the measurements apply. Examples of measurements include, but are not limited to, a distance, an area, a volume, an angle, a mass or weight, and an engineering tolerance. Other concurrently displayed images include, but are not limited to a label associated with at least one of a) the augmented reality image, b) the physical object, and c) the virtual object, as well as instructions for carrying out a task with respect to the augmented reality image.

The one or more embodiments are well suited for use in oilfield or wellsite planning. For example, the geographical location may be a wellsite of an oilfield, in which case the physical object may be equipment for carrying out oilfield operations. The one or more embodiments provide for concurrently displaying instructions for carrying out a task with respect to at least one of a) the oilfield, b) the equipment, and c) a combination thereof. The one or more embodiments may also be used to create an oilfield plan using the augmented view.

The one or more embodiments also provide for a cloud-based service useable by multiple different third party users of virtual oilfield planning using augmented reality. In an embodiment, each overhead image and/or virtual map is encrypted and logically isolated from other overhead images and/or virtual maps in the data repository used by the cloud-based service. Passwords and/or user sign-on credentials prevent unauthorized users from accessing unauthorized overhead images or virtual maps. Thus, multiple different users, who have unrelated business ventures, may use the cloud-based service of the one or more embodiments while maintaining cyber security regarding their respective data.

In addition to augmented reality, the data structure created according to the method of FIG. 4 may be used to support a multitenant collaborative virtual reality planning environment. The term "multitenancy," in the context of software, refers to a software architecture in which a single instance of software runs on a server and serves multiple tenants A tenant is a group of computers or users who share a common access with specific privileges to the software instance.

In particular, the data structure may be used to create a multitenant environment when the wellsite of different owners have their own coordinate systems, but are calibrated to geographical positions. The data structure allows a specifically defined coordinate system for a specific image to be converted back to reference real positions and orientations in the real world. Thus, each wellsite may be represented as a digital copy of the actual wellsite in unique coordinates specified for the particular wellsite. The specifically defined coordinates may be encrypted with common encryption techniques, and therefore be non-traceable by unauthorized users to the real geographic positions. Thus, the data structure may be used to enhance privacy and cyber security among different business ventures in the same cloud-based environment.

FIG. 5 is a visual representation of the method shown in FIG. 4, in accordance with an embodiment. In particular, image (500) shows an overhead image of an oilfield (502) having multiple wellsites, including first wellsite (504), second wellsite (506), third wellsite (508), fourth wellsite (510), and fifth wellsite (512). Each wellsite includes at least terrain, but may also include objects, such as real object (514) imaged in the overhead image of the fourth wellsite (510). Again, an object may be equipment or terrain features. Subsurface structures, such as subsurface structure (516) under fourth wellsite (510) may also be added to over overlaid on the overhead image (500). Note that each wellsite may be operated by the same or different business ventures.

Each wellsite may have its own overhead wellsite image. Each overhead wellsite image may be transformed into a virtual map in the manner descried above. Thus, first arrow (518) shows the relationship between the overhead wellsite image for the first wellsite (504) and the corresponding first virtual map (520) of the first wellsite (504). Similarly, second arrow (522) shows the relationship between the overhead wellsite image for the second wellsite (506) and the corresponding second virtual map (524) of the second wellsite (506). Likewise, third arrow (526) shows the relationship between the overhead wellsite image for the third wellsite (508) and the corresponding third virtual map (528) of the third wellsite (508). Additionally, fourth arrow (530) shows the relationship between the overhead wellsite image for the fourth wellsite (510) and the corresponding fourth virtual map (532) of the fourth wellsite (510). A virtual map for the fifth wellsite (512) is omitted from FIG. 5 for clarity, but may be present.

Each virtual map may be two dimensional, three dimensional, or possibly higher dimensional map. Dimensions in excess of three may represent properties other than spatial dimensions, such as time, stage of construction, subsurface structure changes, etc., and may be represented visually via color and/or via animation. From a data structure standpoint, multiple dimensions may be tracked and manipulated using matrices of corresponding dimensions.

Each virtual map need not be of the same dimension. In other words, some virtual maps may be two dimensional, others three dimensional, still others four dimensional, etc.

Because each virtual map is maintained logically separate from each other virtual map on the data repository, each virtual map has a distinct coordinate system. In the example shown in FIG. 5, each coordinate system for each virtual map is a Cartesian coordinate system, for which each Cartesian coordinate is associated with a corresponding rotation angle, as described above. Thus, for example, the pixels in the first virtual map (520) are assigned first coordinate and rotation values (534) $X_i^1$, $Y_i^1$, $Z_i^1$, $X_{Ri}^1$, $Y_{Ri}^1$, and $Z_{Ri}^1$. Similarly, the pixels in the second virtual map (524) are assigned second coordinate and rotation values (536) for $X_i^2$, $Y_i^2$, $Z_i^2$, $X_{Ri}^2$, $Y_{Ri}^2$, and $Z_{Ri}^2$. Likewise, the pixels in the third virtual map (528) are assigned third coordinate and rotation values (538) for $X_i^3$, $Y_i^3$, $Z_i^3$, $X_{Ri}^3$, $Y_{Ri}^3$, and $Z_{Ri}^3$. Additionally, the pixels in the fourth virtual map (532) are assigned second coordinate and rotation values (540) for $X_i^4$, $Y_i^4$, $Z_i^4$, $X_{Ri}^4$, $Y_{Ri}^4$, and $Z_{Ri}^4$.

In each case, the letters "X," "Y," and "Z" stand for the values for the Cartesian axes in question. The letter "i" stands for the "$i^{th}$" value corresponding to an individual pixel. The letter "R" stands for "rotation." The superscript refers to the virtual map being referenced. Thus, for example, $Z_{Ri}^4$ refers to the rotation angle assigned to value on the Z axis of the $i^{th}$ pixel in the fourth virtual map (532). The grand total of the $Y_i$, $Z_i$, $X_{Ri}$, $Y_{Ri}$, and $Z_{Ri}$ for a given virtual map may be represented by a data structure in the form of a matrix, of which FIG. 6 is an example.

Virtual representations of real objects, as well as virtual objects, may be defined by a set of pixels in a virtual map. Thus, for example, a first virtual representation (542) of the corresponding real object (514) imaged in the image of the fourth wellsite (510) is defined by a set of pixels. Likewise, a second virtual representation (544) of the corresponding subsurface structure (516) is defined by another set of pixels. Each virtual map may include many different sets of pixels representing the virtual representations of real objects or representing the virtual objects.

Each set of pixels may be associated with a corresponding matrix specified by: $Y_{i-j}^N$, $Z_{i-j}^N$, $X_{Ri-j}^N$, $Y_{Ri-j}^N$, and $Z_{Ri-j}^N$. In this case, "i-j" represents the range of pixels that form the object in question, though "i-j" need not be a contiguous set of numbers if the object in question is discontinuous. The value of "N" refers to the number identifying the virtual map in question.

FIG. 6 is an example of a data structure for representing a virtual representation of a physical object shown in an image, in accordance with an embodiment. Data structure (600) may be data structure (320) shown in FIG. 3, may be the data structured mentioned in the method shown in FIG. 4, and may be one example of the matrices described with respect to FIG. 5.

Data structure (600) may take the form of a matrix or table having rows representing pixels in an overhead image and columns representing values, metadata, or other information associated a given pixel. The data structure (600) may be defined for the entire image, may be for a set of pixels within the image (as described with respect to FIG. 5), or may be for a set of pixels defining a virtual object. The data structure (600) may be a three-dimensional matrix, with the additional axis representing individual objects and virtual objects defined for the virtual map.

The data structure (600) includes the rows shown. Row 602 is optional, being an identifier row that identifies the type of information in each column. Row 604 represents information associated with Pixel A, row 606 represents information associated with Pixel B, row 608 represents information associated with Pixel C, and row 608 represents information associated with Pixel D. More or fewer pixels, and hence more or fewer rows, may be present.

Column 612 represents the values of pixel identifiers. Column 614 represents the values of scaled X coordinates for the associated pixels in the Cartesian coordinate system. Column 616 represents the values of scaled Y coordinates for the associated pixels in the Cartesian coordinate system. Column 618 represents the values of scaled Z coordinates for the associated pixels in the Cartesian coordinate system. Column 620 represents the values for the rotation angles associated with the corresponding scaled X coordinates for the pixels. Column 622 represents the values for the rotation angles associated with the corresponding scaled Y coordinates for the pixels. Column 624 represents the values for the rotation angles associated with the corresponding scaled Z coordinates for the pixels.

The data structure (600) need not be a table, array, or flat data structure. The data structure (600) may take the form of a linked list, a record, a union, a tagged union, a graph, a tree, a trie, a hash table, a combination thereof, etc.

Additionally, the data structure (600) may include additional information. For example, a given pixel may be associated with metadata, such as but not limited to the time an image was taken, a wellsite location associated with the pixel, an identifier for the particular image from which the pixel was taken, or possibly any other information which is desirable to associate with a pixel. Thus, the data structure (600) may be more complex than the array shown.

Figure 7:
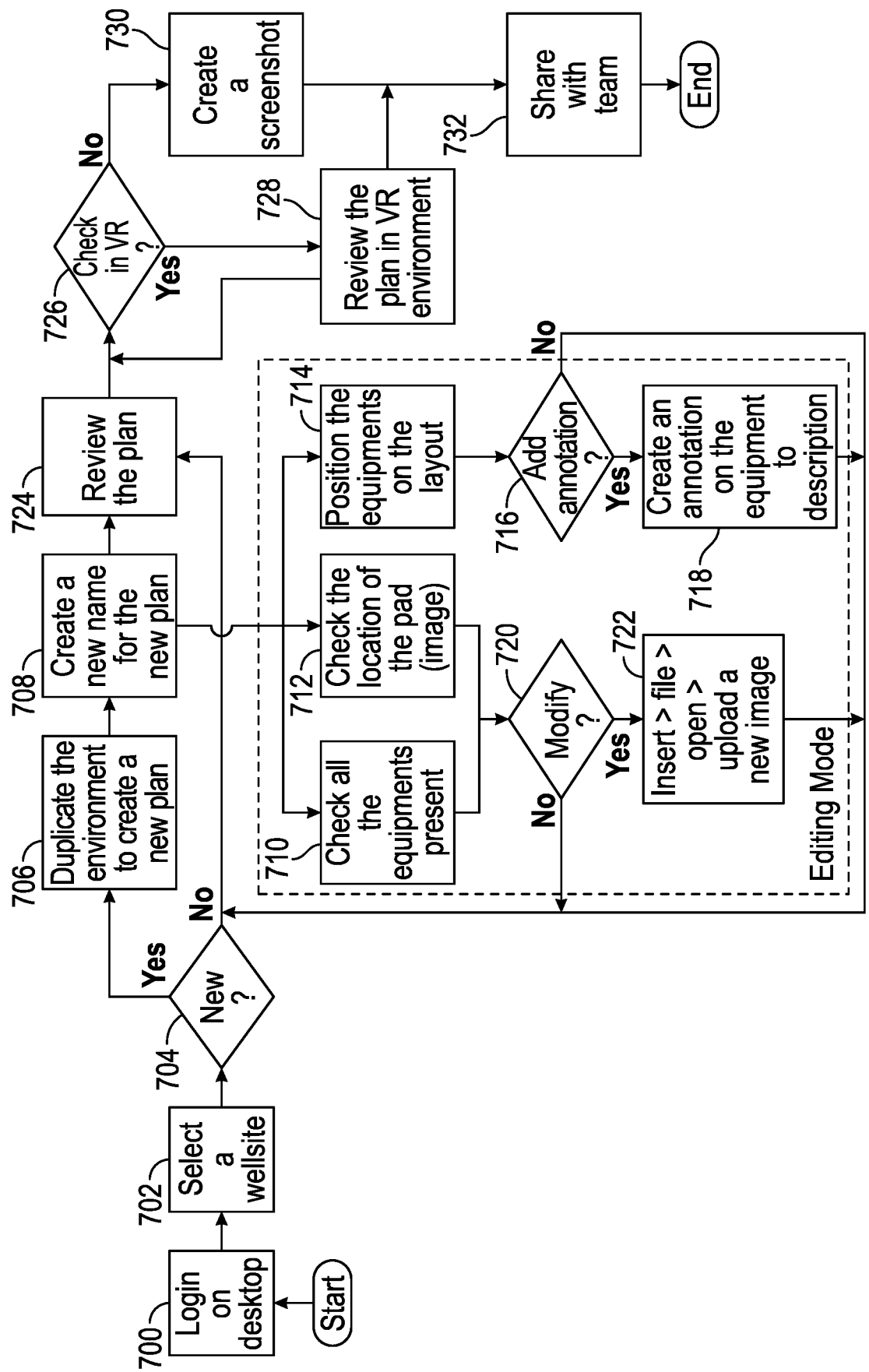
FIG. 7 and FIG. 8 show user task flow flowcharts, in accordance with an embodiment.
Figure 8:
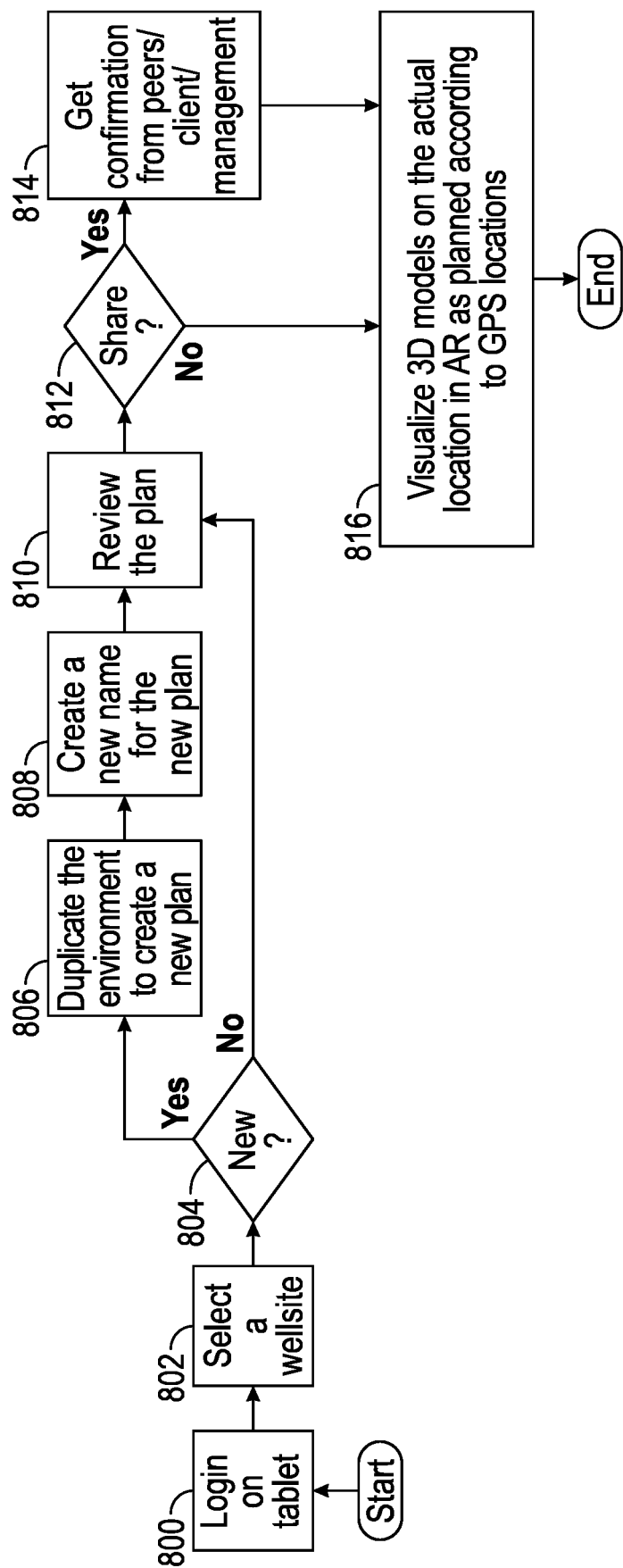

FIG. 7 and FIG. 8 show user task flow flowcharts, in accordance with an embodiment. In particular, FIG. 7 and FIG. 8 show two principal workflows of creating an immersive avatar of a wellsite location. First is the planning phase, which may be done on a desktop or laptop computer and confirmed user the virtual reality possibilities. FIG. 7 shows an immersive wellsite location planning workflow. The second part of the workflow may be performed using mobile devices and Augmented reality devices, implemented at the wellsite while confirmation or execution phase. FIG. 8 shows a mobile augmented reality device assisted workflow for planning confirmation and execution phase. The workflows of FIG. 7 and FIG. 8 presume usage of real location drawings, images or 3D models to augment existing infrastructure with planned infrastructure for the planned service job. The images or 3D models can be obtained from engineering drawings or satellite visual imagery or drone or aero photo capturing, as described above.

Turning first to FIG. 7, at 700 a user logs in to a desktop or other computer. At 702, the user selects a wellsite using the cloud-based virtual reality-based software. At 704, a determination is made whether to begin a new plan. If not, then the method may skip to 724 to review an existing plan.

Otherwise, if yes at 704, the user may duplicate an existing environment to create a new plan. Alternatively, the user may create a new environment. In either case, at 708, the user creates a new name for the new plan. At this point, the user enters an editing mode of the cloud-based software.

At this point, any or a combination of three tasks may be performed, possibly concurrently. At 710, the user may check the equipment present at the wellsite. At 712, the user may check, the location of the pad at the wellsite. At 714, the user may position equipment on the layout for the wellsite.

In the latter case, the user may determine whether to add any annotations to the plan. If not, then the process may return to 724, possibly pending concurrent tasks at 710 and 712. At 718, the user may then create or otherwise add one or more annotations on the equipment to the description of the plan. Again, the process may return to 724, possibly pending concurrent tasks at 710 and 712.

Returning to 710 and/or 712, in either case, at 720, the user may determine whether to modify the equipment or the location of the pad. If so, then at 722, the user may upload a new image or over overlay another image over image of the wellsite selected at 702. Thereafter, or if the user decides not to modify the image at 720, then the process returns to 724.

Turning now to 724, the user reviews the plan. The user, at 726, then determines whether to check the plan in a virtual reality environment. If so, then at 728, the user reviews the plan in the virtual reality environment. The process then returns to 726 and loops until the user decides not to continue to check the plan in the virtual reality environment at 726.

When the user is done (a "no" decision at 726), then at 730 the user may create a screenshot of the plan. If desirable, the user may again review the plan by returning to 728. Otherwise, at 732, the user may share the plan with a team or may otherwise store or publish the plan. The method of FIG. 7 may terminate thereafter.

Turning now to FIG. 8, another user task flow is shown for an augmented reality process. Beginning at 800, a user may login at a tablet, mobile phone, or other remote computing device. At 802 the user selects a wellsite at which the user desires to use the augmented reality service.

At 804, a determination is made whether to begin a new augmented reality environment. If not, then the process skips to 810. Otherwise, at 806, the user may duplicate an environment to create a new plan. Alternatively, the user may initiate a new plan, or modify an existing plan. However the user proceeds at 808, the user creates a new name for the new plan. At 810, the user then reviews the plan.

At 812, the user then determines whether to share the plan. If so, then at 814 the user may confirm whether to proceed with sharing. For example, the user may be subject to internal control procedures which call for confirmation from a peer, a manager, a client, etc.

Whatever the decision at 812 (and if desirable, after 814), then at 816 the user may visualize 3D models at the actual location in augmented reality as planned according to global positioning system locations. If shared at 814, then the augmented reality displayed on the remote computing device is shared with other users, perhaps streamed in real time. If not shared at 812, then the augmented reality is displayed on the remote computing device. The method of FIG. 8 may terminate thereafter.

Thus, the immersive field planning workflow of either FIG. 7 or FIG. 8 may extend to the solutions using augmented reality when an object of a planned wellsite layout is positioned in a field using augmented reality modeling and a location defined by the global positioning system. The workflows may include a combination of tools used for planning the layout on the wellsite when a wellsite avatar is available as a cloud hosted model. The cloud hosted model may be accessible from any computing device, including desktop computers, laptops, tablet, smartphones, or others.

Figure 9:
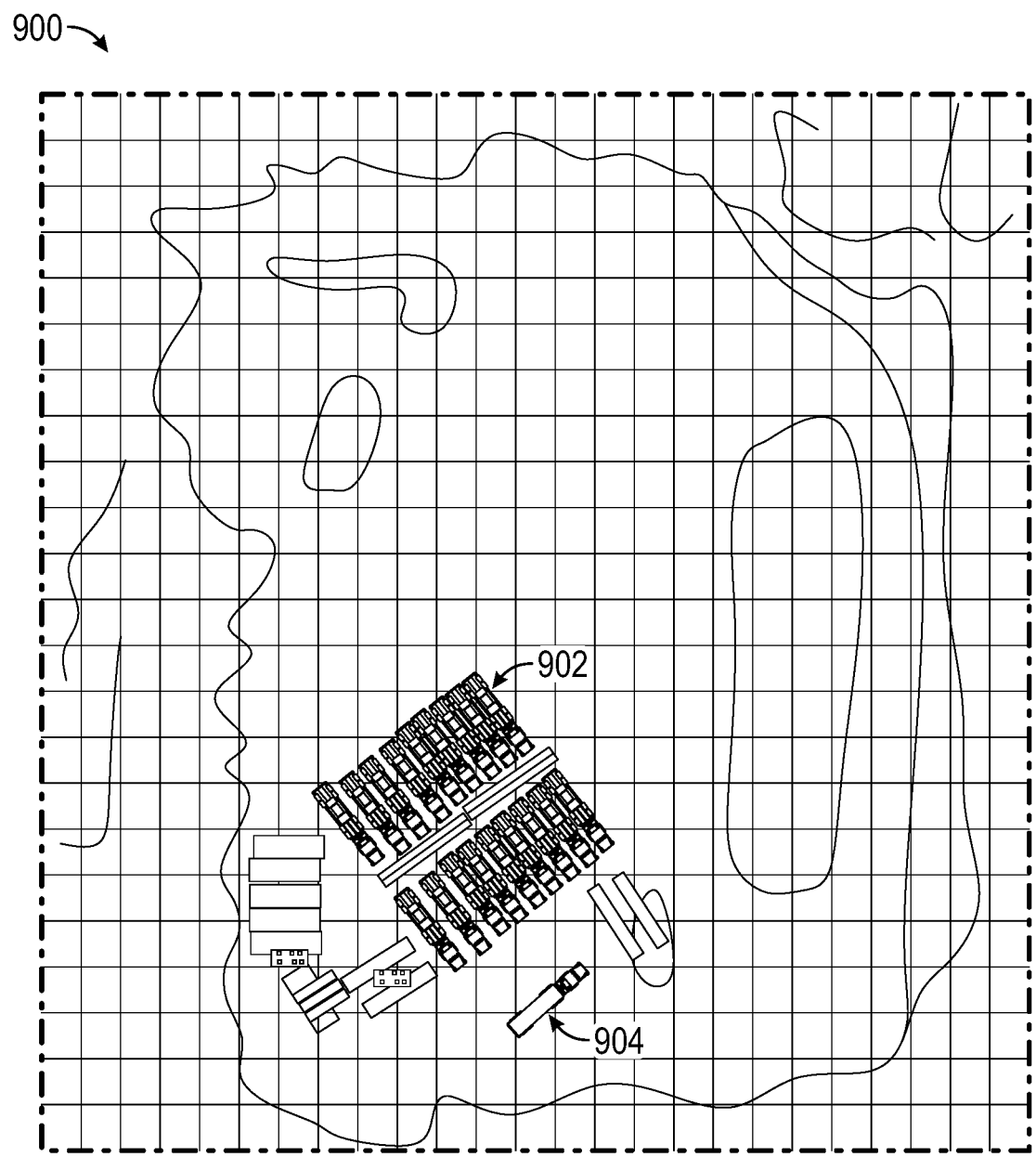
FIG. 9, FIG. 10, FIG. 11, FIG. 12, and FIG. 13 show example interfaces in accordance with an embodiment.

FIG. 9, FIG. 10, FIG. 11, FIG. 12, and FIG. 13 show example interfaces in accordance with an embodiment. FIG. 9 shows an overhead image (900) of a wellsite. The overhead image (900) includes equipment, such as truck (902) or truck (904). The overhead image (900) may have been by a satellite, drone, balloon, aircraft, etc. The overhead image (900) may have been created using the overhead mapping system (200) of FIG. 2A or the overhead mapping system (344) of FIG. 3.

Figure 10:
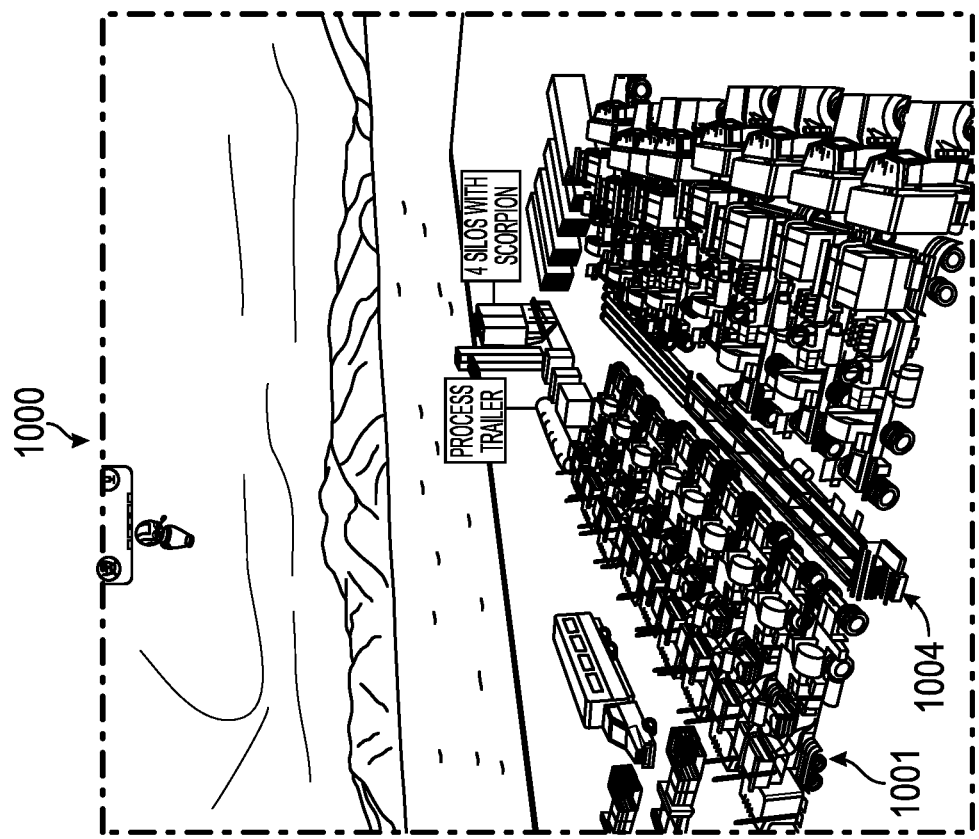

FIG. 10 shows an example of a virtual map (1000) created from the overhead image (900) shown in FIG. 9. The virtual map (1000) may have been created using the visualization system (204) of FIG. 2A or the visualization system (346) of FIG. 3.

The virtual map (1000) shows virtual representations of real objects, such as for example truck (1002). Truck (1002) is a virtual representation of a real truck imaged in the overhead image (900). The truck (1002) is defined by a set of pixels, as described above.

The virtual map (1000) also shows virtual objects, such as for example virtual equipment (1004). The virtual equipment (1004) is defined by another set of pixels within the virtual map (1000). The virtual equipment (1004) is highlighted blue so that the user can easily distinguish what objects in the virtual map (1000) are really present at the wellsite and what objects in the virtual map (1000) are not really present at the wellsite.

The user may use the virtual map (1000) for wellsite planning. The user may move both virtual objects and virtual representations of real objects to make physical planning of the wellsite a simpler task. The user may add additional virtual objects or add notes or measurements. The objects shown may be to the same scale; i.e., a physical scale.

Figure 11:
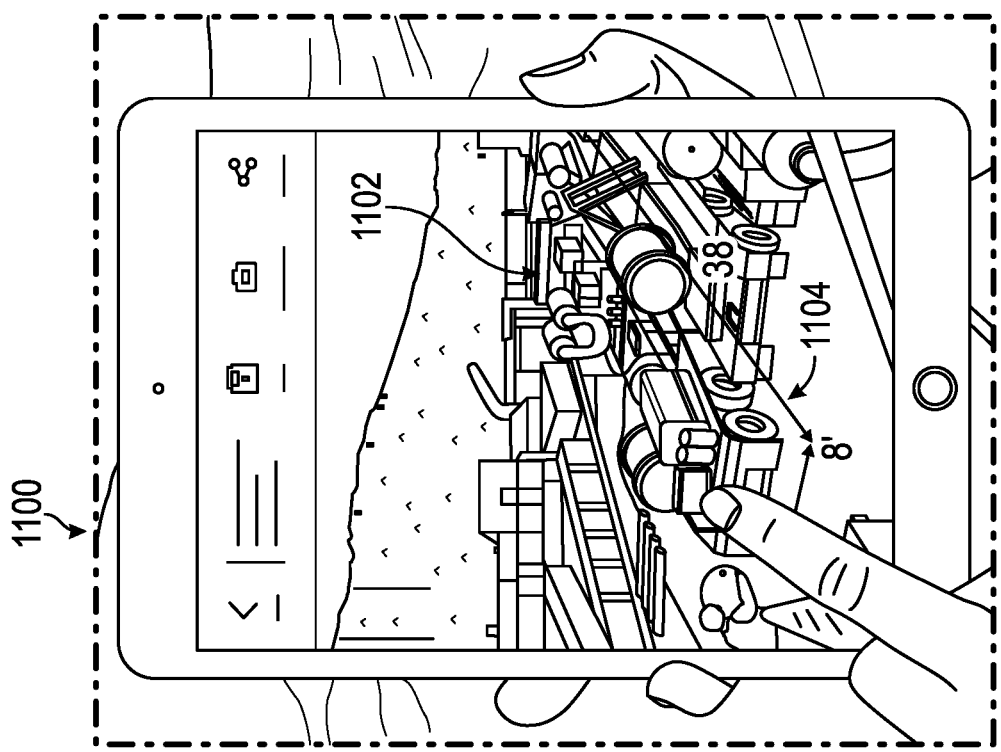

FIG. 11 demonstrates the virtual reality and collaborative aspect of created immersive workflow for equipment positioning at the wellsite. The collaboration is a part of the workflow that is specific to the immersive avatar of an actual location. Collaboration is also specific to the planning and execution side of the service being performed on location of the wellsite.

In particular, FIG. 11 shows a mobile tablet remote computer (1100) displaying an augmented reality environment on a display. The concurrently taken real image generated using the mobile tablet remote computer (1100) is overlaid with a highlighted virtual object (1102) generated by the cloud hosted service. The highlighted virtual object (1102) does not yet exist at the wellsite, or at least is not at the position shown at the wellsite. However, because the highlighted virtual object (1102) is at the physical scale of the real objects concurrently shown, the augmented reality view allows the user to see how the highlighted virtual object (1102) will fit together with the real objects. Additionally, measurements (1104) of the highlighted virtual object (1102) are also added to the concurrently taken image or video of the mobile tablet remote computer (1100).

Note that variations are possible. For example, at least some of the objects (virtual representations of real objects or virtual objects) from the virtual map (1000) may be overlaid on the image concurrently taken by the mobile tablet remote computer (1100). Additionally, the concurrently taken image may be streamed on a cloud-based computer and then shown to a distant user who is potentially far from the wellsite. The distant user may manipulate the virtual environment and/or the augmented reality image so that the distant user can generate desired virtual changes to be shown on the mobile tablet remote computer (1100). Thus, the augmented reality service demonstrated by FIG. 11 may be collaborative in nature.

Figure 12:
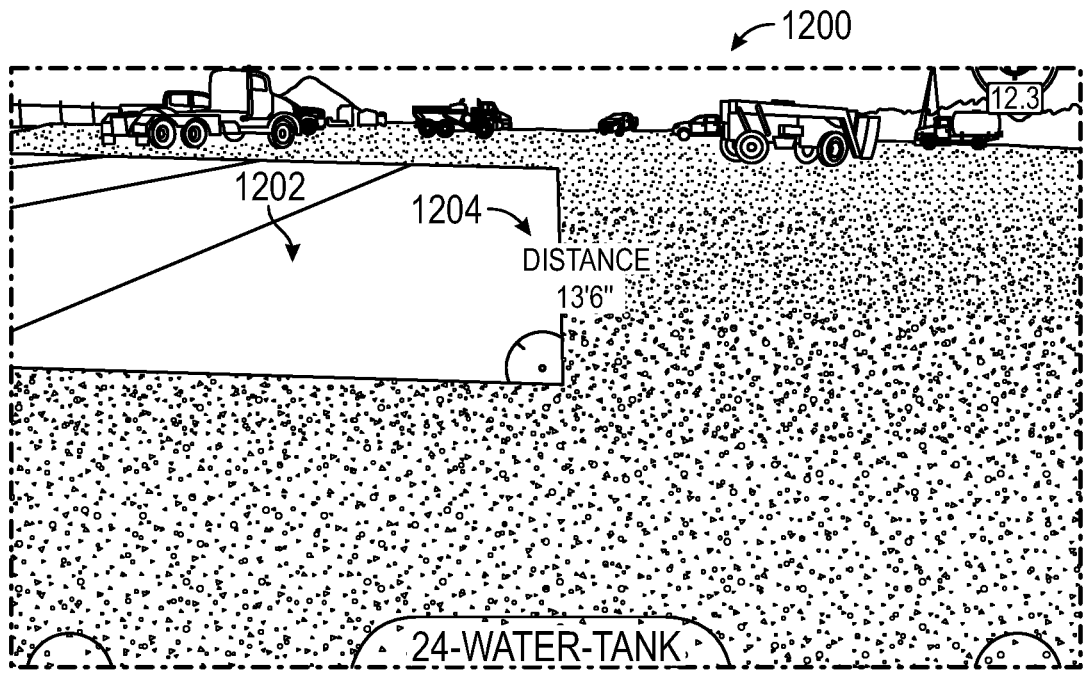
Figure 13:
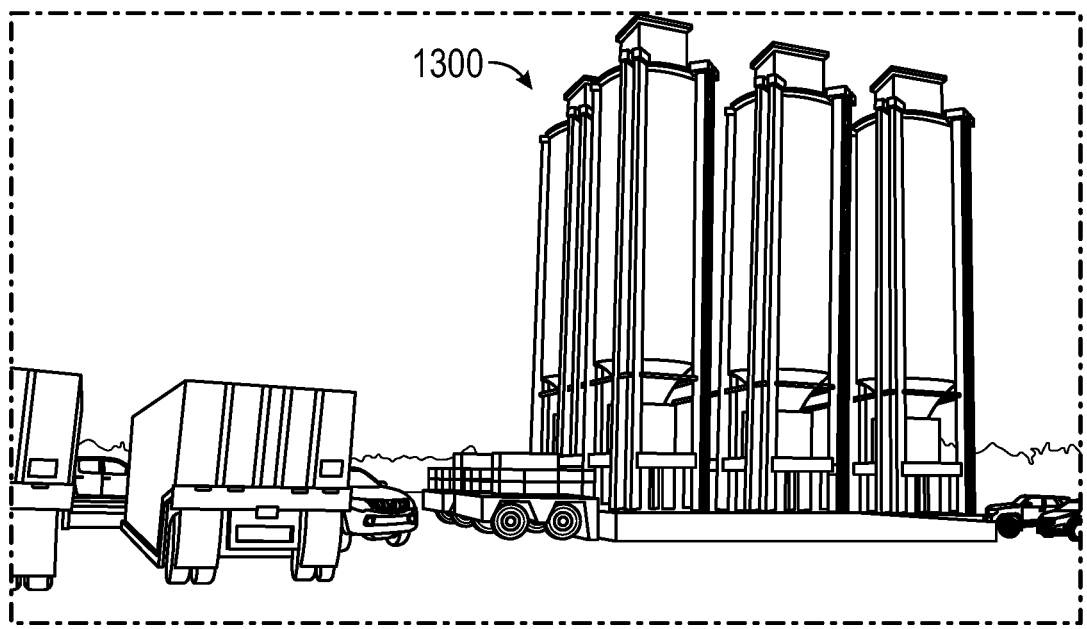

FIG. 12 and FIG. 13 show another example of use of an augmented reality planning system, relative to FIG. 11. In FIG. 12 and FIG. 13 a user desires to see how a set of water tanks would appear at a wellsite. In FIG. 12, starting from a concurrently taken image (1200) of a remote computing device, the user sets a virtual foundation (1202) to be overlaid over the concurrently taken image (1200). The virtual foundation (1202) may simply be an area where the user is contemplating placing the water tanks. The user may establish dimensions (1204), or known dimensions of the water tanks taken from the corresponding virtual reality environment may be displayed.

Turning to FIG. 13, the user (or a distant user) may then add virtual water tanks (1300) in the location of the virtual foundation (1200). The user may move about the wellsite while pointing the camera of the remote computing device at the location where the virtual water tanks (1300) are placed.

Because of the data structure (e.g. data structure (600) of FIG. 6), the augmented reality service is able to continually calculate changes of rotation angle and position coordinates of the virtual water tanks (1300) relative to the real terrain and objects in the concurrently taken image. As a result, the data structure (600) allows the user of the remote computing device to continue to see different angles of the virtual water tanks (1300) as the user moves around. Thus, the data structure of the one or more embodiments may be used to improve the ability of a remote computing device and/or a cloud-hosted service to establish an improved augmented reality environment.

Thus, from the above, an embodiment is focused on a workflow using combination of technologies to plan a wellsite location in a collaborative immersive environment, which may be referred-to as XR (cross reality). The workflow of the embodiment may be focused on creating a three dimensional (3D) avatar of the wellsite location for planning purposes in collaborative manner across potentially several different users of the wellsite location. The workflow enables creation of the plan in immersive virtual reality, and thereby execution of the same plan with the help of augmented reality by overlaying geotagged 3D equipment models of equipment on the wellsite. Such planning may include drilling, completion, fracturing, workover, and intervention through well production, as well as transfer to injection or abandonment.

The workflow may create a collaborative environment for sequential planning of the events in real-time. The changes may be stored in the collaborative environment in the form of a virtual map. The workflow may decrease non-productive time and reduce misunderstandings in a sequence of services and/or spatial constraints of the wellsite location.

A cross-reality platform may use cloud based services for storing models and geographic information system (GIS) information inside the cloud project. The equipment models may be stored on the cloud platform and may be referenced to the GIS coordinates. Thus, whenever changes are made to a virtual map, the whole wellsite plan may change according to new changes implemented by one or more of the collaborators.

Figure 14:
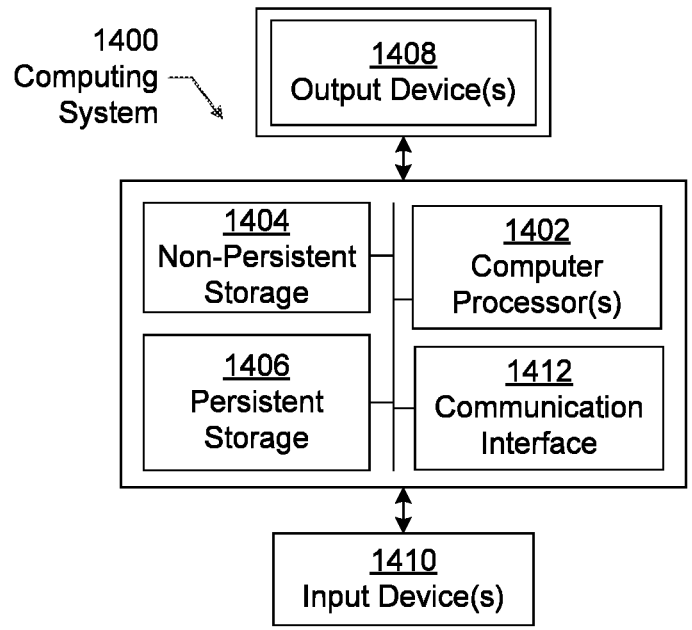
FIG. 14 and FIG. 15 show a computing system in accordance with an embodiment.

Embodiments may be implemented on a computing system. Any combination of mobile, desktop, server, router, switch, embedded device, or other types of hardware may be used. For example, as shown in FIG. 14, the computing system (1400) may include one or more computer processor(s) (1402), non-persistent storage (1404) (e.g., volatile memory, such as random access memory (RAM), cache memory), persistent storage (1406) (e.g., a hard disk, an optical drive such as a compact disk (CD) drive or digital versatile disk (DVD) drive, a flash memory, etc.), a communication interface (1412) (e.g., Bluetooth interface, infrared interface, network interface, optical interface, etc.), and numerous other elements and functionalities.

The computer processor(s) (1402) may be an integrated circuit for processing instructions. For example, the computer processor(s) may be one or more cores or micro-cores of a processor. The computing system (1400) may also include one or more input device(s) (1410), such as a touchscreen, keyboard, mouse, microphone, touchpad, electronic pen, or any other type of input device.

The communication interface (1412) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the computing system (1400) may include one or more output device(s) (1408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1402), non-persistent storage (1404), and persistent storage (1406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform an embodiment.

Figure 15:
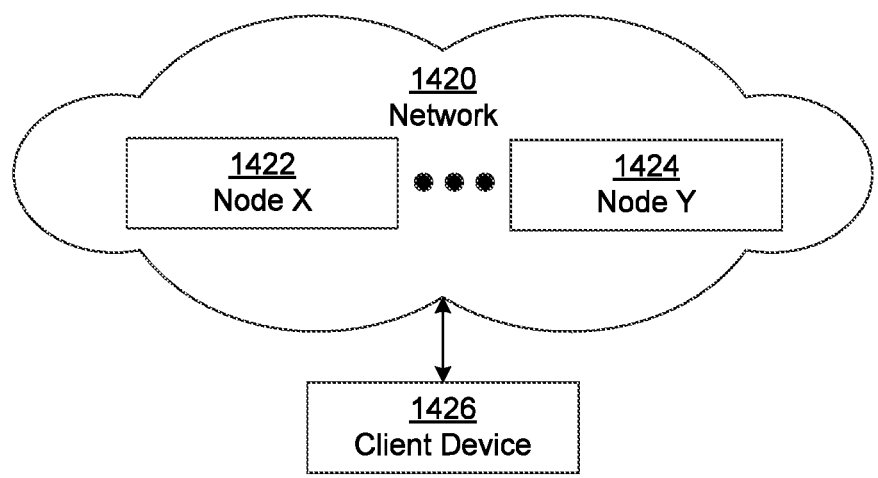

The computing system (1400) in FIG. 14 may be connected to or be a part of a network. For example, as shown in FIG. 15, the network (1420) may include multiple nodes (e.g., node X (1422), node Y (1424)). Each node may correspond to a computing system, such as the computing system shown in FIG. 14, or a group of nodes combined may correspond to the computing system shown in FIG. 14. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1400) may be located at a remote location and connected to the other elements over a network.

Although not shown in FIG. 15, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1422), node Y (1424)) in the network (1420) may be configured to provide services for a client device (1426). For example, the nodes may be part of a cloud computing system. The nodes may include functionality to receive requests from the client device (1426) and transmit responses to the client device (1426). The client device (1426) may be a computing system, such as the computing system shown in FIG. 14. Further, the client device (1426) may include and/or perform an embodiment.

The computing system or group of computing systems described in FIGS. 14 and 11 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the embodiments. The processes may be part of the same or different application and may execute on the same or different computing system.

Rather than or in addition to sharing data between processes, the computing system performing an embodiment may include functionality to receive data from a user. For example, in an embodiment, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing an embodiment of the embodiments, may extract one or more data items from the obtained data. For example, the extraction may be performed as follows by the computing system in FIG. 14. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 14, while performing an embodiment, may perform data comparison. Data comparison may be used to compare two or more data values (e.g., A, B). For example, an embodiment may determine whether A>B, A=B, A !=B, A<B, etc. The comparison may be performed by submitting A, B, and an opcode specifying an operation related to the comparison into an arithmetic logic unit (ALU) (i. e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In an embodiment, B may be considered a threshold, and A is deemed to satisfy the threshold if A=B or if A>B, as determined using the ALU. In an embodiment, A and B may be vectors, and comparing A with B compares the first element of vector A with the first element of vector B, the second element of vector A with the second element of vector B, etc. In an embodiment, if A and B are strings, the binary values of the strings may be compared.

The computing system in FIG. 14 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 14 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 14 and the nodes and/or client device in FIG. 15. Other functions may be performed using an embodiment.

Although a few example embodiments have been described in detail above, those skilled in the art will readily appreciate that many modifications are possible in the example embodiments without materially departing from augmented reality planning of geographic locations. Accordingly, such modifications are intended to be included within the scope of this disclosure as defined in the following claims. In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method comprising:
  obtaining an initial first image of a geographical location and a physical object located within the geographical location;
  assigning a plurality of pixels in the initial first image to corresponding points in a Cartesian coordinate system defined specifically for the initial first image to form a processed first image;

assigning, to generate a virtual map comprising a virtual representation of the physical object, a set of initial Cartesian coordinates to a set of pixels in the plurality of pixels, and a set of Cartesian rotation angles to the set of pixels;

calculating a first transform that scales the Cartesian coordinate system to a physical scale of the geographical location; and applying, to form a data structure stored in a data repository, the first transform to the virtual map, wherein:

the data structure comprises the set of pixels, a set of scaled Cartesian coordinates assigned to the set of pixels, and the set of Cartesian rotation angles assigned to the set of pixels, and the data structure further comprises a physical scale virtual representation of the physical object.

2. The method of claim 1, wherein:

each Cartesian coordinate in the set of initial Cartesian coordinates is assigned a corresponding rotation angle, and each corresponding rotation angle is defined with respect to a corresponding reference direction on the initial first image.

3. The method of claim 1, further comprising:

receiving a second image, of a portion of the geographical location, from a camera of a remote computing device;

comparing the data structure to the second image to establish a second transform operable to transform positions in the data structure to corresponding positions in the second image;

creating a virtual object in the virtual map;

transforming the virtual object using the second transform to form an augmented reality image; and transmitting the augmented reality image to the remote computing device.

4. The method of claim 3, further comprising:

displaying, on a display of the remote computing device, the augmented reality image overlaid on a concurrent image of the geographical location received by the camera to create an augmented view, wherein the augmented reality image and the concurrent image are displayed at a same scale.

5. The method of claim 4, further comprising:

manipulating the augmented reality image on the display using a graphical user interface while continuing to display the concurrent image.

6. The method of claim 4, further comprising:

changing a zoom setting on the camera; and adjusting a displayed size of the augmented reality image to maintain the same scale.

7. The method of claim 4, wherein the geographical location comprises a wellsite of an oilfield, wherein the physical object comprises equipment for carrying out oilfield operations, and further comprising:

creating an oilfield plan using the augmented view.

8. The method of claim 3, further comprising:

concurrently displaying measurements of at least one of a) the augmented reality image, b) the physical object, and c) the virtual object.

9. The method of claim 8, wherein the measurements are selected from the group consisting of: a distance, an area, a volume, an angle, a mass or weight, and an engineering tolerance.

10. The method of claim 3, further comprising:

concurrently displaying a label associated with at least one of a) the augmented reality image, b) the physical object, and c) the virtual object.

11. The method of claim 3 further comprising:

concurrently displaying instructions for carrying out a task with respect to the augmented reality image.

12. The method of claim 3, further comprising:

transferring the processed first image to a visualization system; and transferring the virtual map to an augmented reality system for comparing the virtual map to the second image;

wherein the visualization system and the augmented reality system are cloud-based services.

13. The method of claim 3, wherein the geographical location comprises a wellsite of an oilfield, wherein the physical object comprises equipment for carrying out oilfield operations, and further comprising:

concurrently displaying instructions for carrying out a task with respect to at least one of a) the oilfield, b) the equipment, and c) a combination thereof.

14. The method of claim 1, wherein calculating the first transform comprises:

calculating a correspondence between each X-Y-Z point in the set of initial Cartesian coordinates and a latitude, longitude, and elevation of each pixel in the initial first image.

15. The method of claim 1, further comprising:

encrypting the virtual map; and logically isolating the virtual map from others of a plurality of virtual maps stored in the data repository.

16. A system comprising:

a server;

a data repository storing:

an initial first image of a geographical location and a physical object located within the geographical location, the initial first image comprising a plurality of pixels, a processed first image comprising a Cartesian coordinate system assigned to the plurality of pixels, the Cartesian coordinate system defined specifically for the initial first image, a virtual map comprising a virtual representation of the physical object in the Cartesian coordinate system, the virtual representation of the physical object comprising a set of pixels, in the plurality of pixels, that compose the virtual representation of the physical object, a set of initial Cartesian coordinates associated with each of the set of pixels, and a set of Cartesian rotation angles associated with each of the set of initial Cartesian coordinates, a first transform that is applicable to scale the Cartesian coordinate system to a physical scale of the geographic location, and a data structure comprising a physical scale virtual representation that comprises the set of pixels, a set of scaled Cartesian coordinates, and the set of Cartesian rotation angles for the physical scale virtual representation of the physical object; and a cloud-based data structure formation service executable on the server for generating the data structure by:

assigning the plurality of pixels to a corresponding point in the Cartesian coordinate system;

generating the virtual map by assigning the set of initial Cartesian coordinates and the set of Cartesian rotation angles to the set of pixels;

calculating the first transform; and forming the data structure by applying the first transform to the virtual map.

17. The system of claim 16, further comprising:
a cloud-based augmented reality service stored on the data repository and executable by the server for generating an augmented reality view for display on a remote computing device comprising a camera, by:
receiving a second image, of a portion of the geographical location, from the camera of the remote computing device;
comparing the data structure to the second image to establish a second transform operable to transform positions in the data structure to corresponding positions in the second image;
creating a virtual object in the virtual map;
transforming the virtual object using the second transform to form an augmented reality image; and
transmitting the augmented reality image for display on the remote computing device.

18. The system of claim 17, further comprising:
the remote computing device comprising a display configured to display the augmented reality image overlaid on a concurrent image of the geographical location received by the camera to create an augmented view, wherein the augmented reality image and the concurrent image are displayed at a same scale.

19. A non-transitory computer readable storage medium comprising computer usable program code which, when executed by a computer, performs a computer-implemented method comprising:
obtaining an initial first image of a geographical location and a physical object located within the geographical location;
assigning each of a plurality of pixels in the initial first image to corresponding points in a Cartesian coordinate system defined specifically for the initial first image to form a processed first image;
assigning, to generate a virtual map comprising a virtual representation of the physical object, a set of pixels in the plurality of pixels for the virtual representation, a set of Cartesian coordinates for the virtual representation, and a set of Cartesian rotation angles for the virtual representation, wherein:
each Cartesian coordinate in the set of Cartesian coordinates is assigned a corresponding rotation angle, and
each corresponding rotation angle is defined with respect to a reference direction on the initial first image;
calculating a first transform that scales the Cartesian coordinate system to a physical scale of the geographical location; and
applying, to form a data structure stored in a data repository, the first transform to the virtual map, wherein:
the data structure comprises the set of pixels, a set of scaled Cartesian coordinates assigned to the set of pixels, and the set of Cartesian rotation angles assigned to the set of pixels, and
the data structure further comprises a physical scale virtual representation of the physical object.

20. The non-transitory computer readable storage medium of claim 19, wherein the computer-implemented method further comprises:
receiving a second image, of a portion of the geographical location, from a camera of a remote computing device;
comparing the data structure to the second image to establish a second transform operable to transform positions in the data structure to corresponding positions in the second image;
creating a virtual object in the virtual map;
transforming the virtual object using the second transform to form an augmented reality image; and
transmitting the augmented reality image to the remote computing device.

\* \* \* \* \*